US007522763B2

(12) United States Patent  (10) Patent No.: US 7,522,763 B2
Tessadro  (45) Date of Patent: Apr. 21, 2009

(54) METHOD OF MEASURING OCCLUDED FEATURES FOR HIGH PRECISION MACHINE VISION METROLOGY

(75) Inventor: Ana Tessadro, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 566 days.

(21) Appl. No.: 10/903,714

(22) Filed: Jul. 30, 2004

(65) Prior Publication Data

US 2006/0023937 A1  Feb. 2, 2006

(51) Int. Cl.
*G06K 9/00* (2006.01)
*G06K 9/48* (2006.01)

(52) U.S. Cl. ........................ 382/141; 382/199
(58) Field of Classification Search ......... 382/141–152, 382/199, 254, 266, 311, 260; 348/92, 125
See application file for complete search history.

(56) References Cited

U.S. PATENT DOCUMENTS

| 5,579,445 | A | * | 11/1996 | Loce et al. ............. 358/1.2 |
| 5,796,868 | A | * | 8/1998 | Dutta-Choudhury ....... 382/199 |
| 5,974,165 | A | | 10/1999 | Giger |
| 6,542,180 | B1 | | 4/2003 | Wasserman et al. |
| 6,563,324 | B1 | * | 5/2003 | Nichani ................ 324/537 |
| 6,627,863 | B2 | | 9/2003 | Wasserman |
| 2002/0076096 | A1 | | 6/2002 | Silber et al. |
| 2002/0158199 | A1 | * | 10/2002 | Takane et al. ............. 250/310 |
| 2003/0095710 | A1 | | 5/2003 | Tessadro |
| 2005/0031191 | A1 | | 2/2005 | Venkatachalam |
| 2006/0245661 | A1 | * | 11/2006 | Beazley ................. 382/260 |

OTHER PUBLICATIONS

Chen, et al (Morphological Pyramids for Multiscale Edge Detection), IEEE, pp. 137-141, 1998.*
Brown, L.G., "A Survey of Image Registration Techniques" *ACM Comp. Surv.* 24(4):325-376, 1992.
Li, H., et al., "A Model-Based Approach for Automated Feature Extraction in Fundus Images," *Proceedings of the Ninth IEEE International Conference on Computer Vision*, Nice, France, Oct. 13-16, 2003, vol. 1, pp. 394 ff.
*Quick Vision CNC Vision Measuring System*, Bulletin No. 1576, Mitutoyo America Corporation, Aurora, Ill., Oct. 2002, pp. 1-24.
*QVPAK 3D CNC Vision Measuring Machine Operation Guide*, Version 2.0, Manual No. 4911GB, Series No. 359, Mitutoyo Corporation & Micro Encoder Inc., Kanagawa, Japan, Sep. 1996.

(Continued)

*Primary Examiner*—Daniel G Mariam
(74) *Attorney, Agent, or Firm*—Christensen O'Connor Johnson Kindness PLLC

(57) ABSTRACT

A method of measuring occluded features in machine vision metrology. The method allows for high precision measurement of features that are partially obscured by an extraneous object (e.g., an overlay grid of a flat panel display screen mask). The method first roughly locates the edge points of the feature to measure. In one embodiment, the rough edge location is performed by using morphology filters to delete the extraneous object (e.g., the grid) and then doing edge detection on the filtered image. Once the rough edge locations are determined, the method then returns to the original unaltered image and for each of the roughly located edge points does edge detection in a close neighborhood of the point in the original unaltered image. These refined edge points are then used to fit the feature for highly precise measurements.

20 Claims, 20 Drawing Sheets

OTHER PUBLICATIONS

*QVPAK 3D CNC Vision Measuring Machine User's Guide*, Version 7, 1st ed., Manual No. 99MCB225A, Series No. 359, Mitutoyo Corporation & Micro Encoder Inc., Kanagawa, Japan, Jan. 2003.

Sasada, R., et al., "Stationary Grid Pattern Removal Using 2-Dimensional Technique for Moiré-Free Radiographic Image Display," Galloway, Robert L., Jr. (ed.), *Visualization, Image-Guided Procedures, and Display, Proceedings of the SPIE—The International Society for Optical Engineering*, vol. 5029, San Diego, Calif., Feb. 16-18, 2003, pp. 688-697.

Shen, J., "Inpainting and the Fundamental Problem of Image Processing," *SIAM News* 36(5):Jun. 1-4, 2003.

Chen, W., and S. T. Acton, "Morphological Pyramids for Multiscale Edge Detection," Proceedings of IEEE Southwest Symposium on Image Analysis and Interpretation, Tucson, Arizona, Apr. 7, 1988, pp. 137-141.

Extended European Search Report dated Aug. 22, 2007, issued in corresponding Application No. EP 05016124.9, filed Jul. 25, 2005.

Nakamae, K., et al., "Boundary Extraction in the SEM Cross Section of LSI," Proceedings of SPIE (The International Society for Optical Engineering): Intelligent Robots and Computer Vision XX: Algorithms, Techniques and Active Vision, Boston, vol. 4572, Oct. 2001, pp. 451-458.

"Quick Vision Apex: CNC Vision Measuring System," Mitutoyo America Corporation, Aurora, Illinois, Bulletin No. 1757, Jul. 2004.

\* cited by examiner

METHOD OF MEASURING OCCLUDED FEATURES FOR HIGH PRECISION MACHINE VISION METROLOGY

FIELD OF THE INVENTION

The invention relates generally to machine vision inspection systems, and more particularly to a method of measuring occluded features.

BACKGROUND OF THE INVENTION

Precision machine vision inspection systems can be used to obtain precise dimensional measurements of inspected objects and to inspect various other object characteristics. Such systems may include a computer, a user interface, a lighting system, a camera and optical system, and a precision stage that is movable in multiple directions to allow an operator to position the camera to image various features of a workpiece. The user interface, among other things, generally includes various video tools that are positionable on an inspection image. In this way a user of the machine vision inspection system can position and operate the video tools to perform image processing operations that are useful for various control and inspection operations, while having little or no knowledge of image processing. One exemplary prior art system having such features, of a type that can be characterized as a general-purpose "off-line" precision vision system, is the commercially available QUICK VISION™ series of vision inspection machines and QVPAK™ software available from Mitutoyo America Corporation (MAC), located in Aurora, Ill. The features and operation of the QUICK VISION™ series of vision inspection machines, and the QVPAK™ software, including the user interface and various video tools are generally described, for example, in the QVPAK 3D CNC Vision Measuring Machine Users Guide, published January 2003 and the QVPAK 3D CNC Vision Measuring Machine Operation Guide, published September 1996, each of which is incorporated herein by reference in its entirety. This product, as exemplified, for example, by the QV-302 Pro model, uses a microscope-type optical system to provide images of a workpiece at various magnifications, and includes all of the features outlined above.

Such general-purpose "off-line" precision vision systems are characterized by their versatility, and they provide the ability for a user or an automatic program to rapidly change their configuration and imaging parameters in order to perform a wide variety of inspection tasks on various types of objects or inspection workpieces, or various aspects of a single workpiece.

General purpose precision machine vision inspection systems, such as the QUICK VISION™ system, are also generally programmable and operable to provide automated video inspection. It is generally desirable that such systems include features and tools that simplify the programming and operation of such systems, such that operation and programming can be performed reliably by "non-expert" operators.

Automated video inspection metrology instruments generally have a programming capability that allows an automatic inspection event sequence to be defined by the user for each particular workpiece configuration. The programming capability also typically provides the ability to store and/or output the results of the various inspection operations. Such programming can be implemented either in a deliberate manner, such as text-based programming, for example, or through a recording mode that progressively "learns" the inspection event sequence by storing a sequence of machine control instructions corresponding to a sequence of inspection operations performed by a user, or through a combination of both methods. Such a recording mode is often referred to as "learn mode," "training mode," or "teach mode."

In these techniques, the machine control instructions are generally stored as a part program that is specific to the particular workpiece configuration. The ability to create part programs with instructions that automatically perform a predetermined sequence of inspection operations during a "run mode" of operation provides several benefits, including enhanced inspection repeatability, as well as the ability to automatically execute the same part program on a plurality of compatible machine vision inspection systems and/or at a plurality of times.

In machine vision systems, "occlusion" type problems sometimes arise, that is, situations in which a foreground object interferes with the viewing or inspection of a background object. Occlusion problems have generally not been addressed by general purpose machine vision systems for inspection and measurement of workpieces. Previously, there have been no readily programmable alternatives. In general, the user had to carefully size and place tools using human judgment to avoid the occluding object and/or shadow. In such cases, when inspecting images having foreground and background features, such as edge features, in close proximity in the feature to be inspected, the slightest variation in construction between various workpieces, or lighting and shadows, will cause the carefully positioned and trained tools to fail or provide erroneous results.

Alternatively, various custom-designed region or boundary "growing" and "connection" processes have been used to "reconstruct" a background object feature. However, such methods are time consuming to implement and require considerable knowledge. Furthermore, such methods are actually creating artificial features without actually increasing the "real" information available in the image. Therefore, such methods introduce risk that a particular inspection operation may return results based primarily on the artificial features rather than the original image portions that are known to be real and valid.

As a further alternative, various custom-designed image filtering processes have been designed by specialists to remove the unwanted occluded image features. However, such filtering processes also filter the desired image feature, which alters its characteristics to some extent. In many cases this is undesirable, especially for various precision metrology operations used to inspect a workpiece. For example, certain methods for removing unwanted image features apply morphology filters, such as closing and opening, to "delete" the unwanted image features, and then measure the desired features with standard edge detection tools on the filtered image. Closing and opening filters are effective for removing the unwanted image features, however, the closing and opening filters also modify the location of the edges. Therefore, the edge points that are detected lack the desired accuracy. All of the previously described methods provide a poor basis for quality control and inspection operations, particularly in a general purpose machine vision inspection system intended to provide reliable operation and a relatively simple programming environment for relatively unskilled operators.

The present invention is directed to a system and method that overcomes the foregoing and other disadvantages. More specifically, the present invention is directed to a method of measuring occluded features.

SUMMARY OF THE INVENTION

The present invention is directed to a method of measuring occluded features for high precision machine vision metrology. In accordance with one aspect of the invention, the method first roughly locates the edge points of a feature to be measured. In one embodiment, the rough edge location operations are performed by using morphology filters to delete the extraneous object (e.g., an occluding grid) from the original image and then doing edge detection on the filtered image. Once the approximate edge locations are determined in the filtered image, the method then returns to the original unaltered image and for each of the approximately located edge points does edge detection in a close neighborhood of the same, or congruent, point in the original unaltered image. These refined edge point locations in the original image are the most realistic and accurate point measurements possible and are used to fit the feature for highly precise measurement and inspection. The advantages of this method include that it is fast, is relatively insensitive to filter selection, is more accurate than measuring using a filtered image, and is user friendly in that it is operable and robust using the same user parameters and/or inputs as those utilized in previously known systems.

In accordance with another aspect of the invention, a learn/train/teach mode is utilized (the terms learn mode, train or training mode and teach mode are used interchangeably herein.) In one embodiment, the learn/train/teach mode begins with the acquisition of an image and the use of machine vision system control and image processing tools that are similar to those of known systems. For example, the user may define a region of interest by locating a box tool, or other edge detection tool, around a workpiece feature to be located and/or inspected. However, for an edge tool operating in an extraneous feature avoidance mode, the parameters for a morphology filter, such as its shape, size, and the number of times that it is iteratively applied to provide a filtered image, are set by default, automatic analysis, or user input. The filter is then applied to the input image, at least in the region of interest, to obtain the filtered image. "Preliminary" edge detection is then performed in the ROI on the filtered image, for example utilizing a scan line (or several scan lines) that was designated in the tool for detecting edge points. Various parameters such as the parameters for the morphology filter and the location of the detected edge point (or several edge points in the case of several scan lines) are then saved. The operation of the edge detection tool is then slightly modified based on the location of the previously detected edge points. For each detected edge point a new scan line is then determined that follows the same direction and scan line placement of the original scan line but approximately centered about the location of the detected edge point. If the scan line length was previously set to a value that is greater than required for proper operation of the tool, at this time, since it is now known that the edge point will be found approximately at the pixel that is at the center of the scan line, the scan line length may also be shortened, if desired. The goal of using a shorter scan line is to provide one means of excluding extraneous features or edges, by reducing the candidate edge location to only a small neighborhood of pixels around the approximately known edge location in the original input image. Although it is not strictly necessary, this operation may simplify the following operations and/or increase the edge detection reliability in some cases. Edge detection is then applied to the original input image utilizing the new scan line(s). If the edge detection succeeds, then the resulting edge detection parameters that characterize that specific edge in the original image are saved to govern later automatic operation of the edge detection tool for inspecting the corresponding edge on similar workpieces. Although it is not strictly necessary, similar parameters that characterize the edge in the filtered image may also be saved, to govern later automatic operation of the edge detection tool for the filtered image. This operation may speed up, simplify and/or increase the reliability of edge detection during later automatic operation, in some cases.

In accordance with another aspect of the invention, after the learn/train/teach mode is performed, a run mode (generally a high speed automatic mode) is utilized. In one embodiment, the run mode begins inspection of the corresponding edge with the acquisition of the image and the use of the programmed tools and parameters. The filter that was defined and used in the teach mode is applied to the acquired image to obtain the filtered image. Edge detection is then performed on the filtered image, generally using the edge detection parameters for the filtered image learned during the learn/train/teach mode, and the edge points are detected. For each edge point that is detected, similar to operation in the learn/train/teach mode, a modified scan line is defined along the same direction and scan line placement as the original scan line, but centered at the previously determined edge point and, generally shorter. Edge detection is then performed on the original input image using the new scan lines and the edge detection parameters learned for that edge during the learn/train/teach mode. The location(s) of the detected edge point(s) in the original image are then used to analyze and/or inspect the corresponding occluded feature.

It will be appreciated that the methods of the present invention provide for simple operation by a user, in that standardized types of video tools may be utilized, with few, if any, customization operations. In other words, a user is not required to utilize scripting languages for implementing customized operations to avoid occluding features. Instead, the system allows for the use of pre-programmed icons and the like that even an unskilled user is able to use with minimal training. It should also be appreciated that certain existing machine vision inspection systems can employ various embodiments of the methods according to this invention with minimal or no "retrofit" modifications to such existing machines. In various exemplary embodiments, only the addition of machine vision inspection software methods and/or modifications according to the principles of this invention are required in the retrofit modifications.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
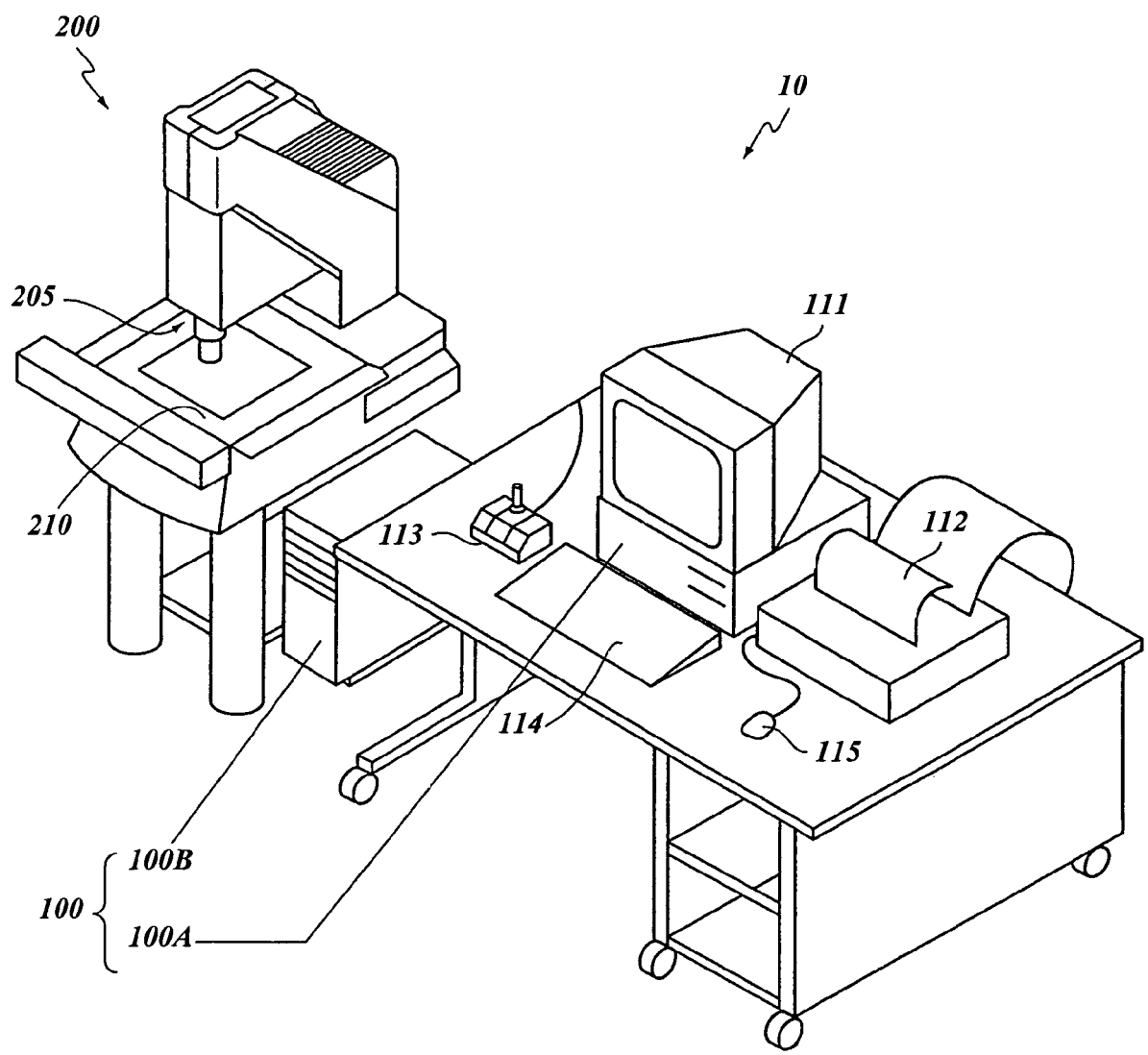
FIG. 1 is a diagram of one exemplary general purpose machine vision and inspection system.

FIG. 1 is a block diagram of one exemplary embodiment of a general purpose programmable machine vision inspection system 10 in accordance with this invention. The machine vision inspection system 10 includes a vision measuring machine 200 that is operably connected to exchange data and control signals with a control system 100. The control system 100 is further operably connected to exchange data and control signals with one or more of a monitor 111, a printer 112, a joystick 113, a keyboard 114, and/or a mouse 115. The vision measuring machine 200 includes a moveable workpiece stage 210 and an optical imaging system 205 which may include a zoom lens or a number of interchangeable lenses. The zoom lens or interchangeable lenses generally provide various magnifications for the images provided by the optical imaging system 205.

The joystick 113 can typically be used to control the movement of the movable workpiece stage 210 in both the X and Y directions, which are generally parallel to the focal planes of the optical imaging system 205, and the movement direction component of the movable optical imaging system 205 in the Z or focus direction. Frequently, the deflection that controls the Z axis is a rotary deflection component of a handle or knob of the joystick 113. The joystick 113 may be provided in a form other than that shown, such as any visual representation or widget on the monitor 111 which is intended to function as a "virtual motion control device" of the machine vision inspection system 10 and is controllable through any computer input device, such as the mouse 115 or the like. The control system 100 and vision measuring machine 200 are described in more detail in copending and commonly assigned U.S. patent application Ser. No. 10/808,948, filed Mar. 25, 2004, which is hereby incorporated by reference in its entirety.

Figure 2:
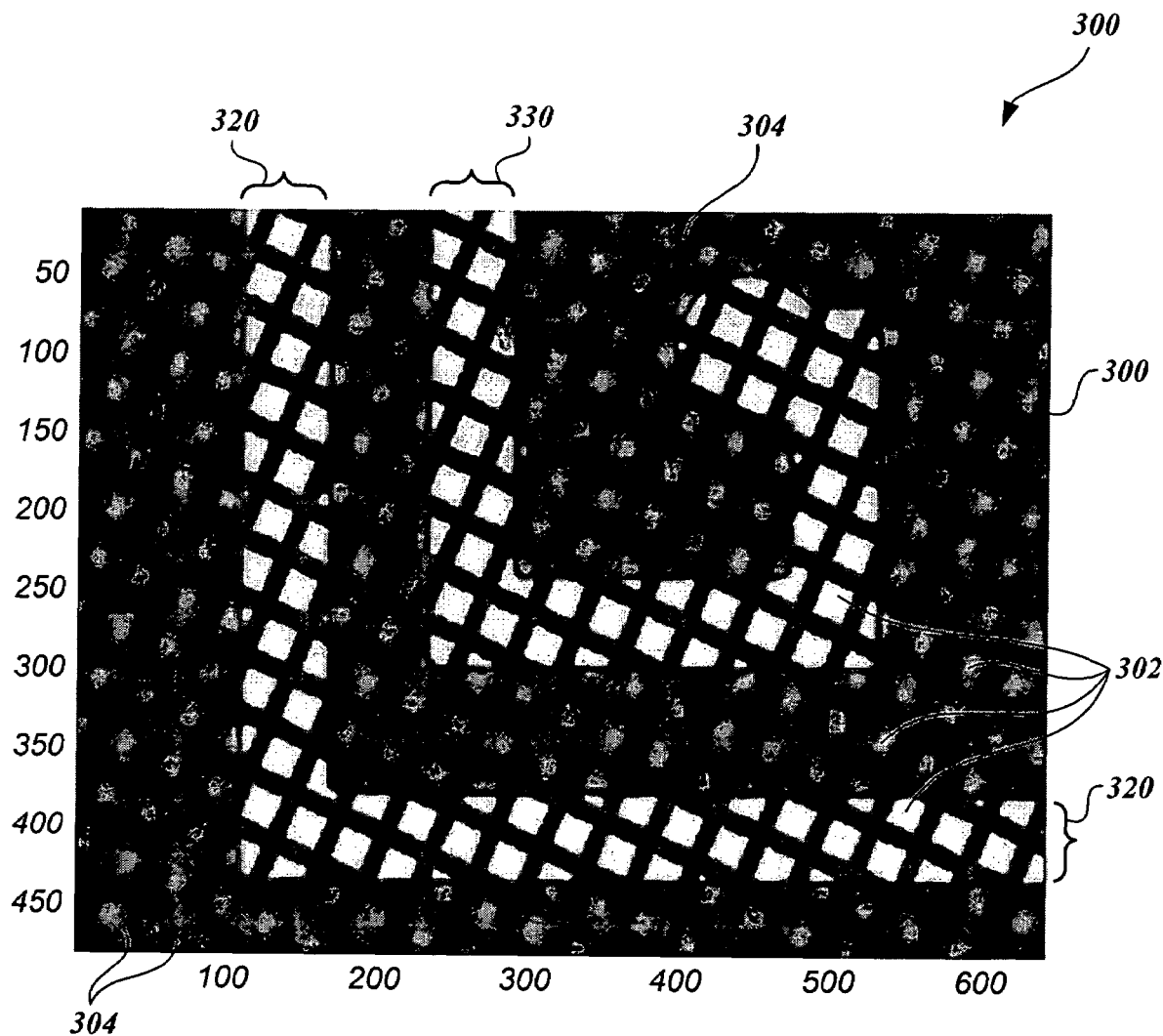
FIG. 2 is a diagram of an exemplary workpiece and feature to be inspected including an occluding grid of a flat panel display screen mask.

FIG. 2 is a diagram of a portion of a display area 300 of a general purpose machine vision inspection system showing an exemplary workpiece and feature to be inspected including an overlay grid of a flat panel display screen mask. As shown in FIG. 2, the display area 300 is in a standard 640×480 camera pixel format, and is overlain by a repetitive grid pattern 304 of the flat panel display screen mask. Also beneath the grid 304 is a background layer 302 which may comprise a substrate, a patterned film, or other surface, and generally includes image information that is not the focus of the measurement process. The objects to be inspected on the workpiece include the traces 320 and 330, which will be described in more detail below. As will also be described in more detail below, the grid pattern 304 complicates the inspection process in that the grid itself inherently has strong interlaced edge features which complicate the determination and evaluation of the edge portions of the traces 320 and 330.

Figure 3:
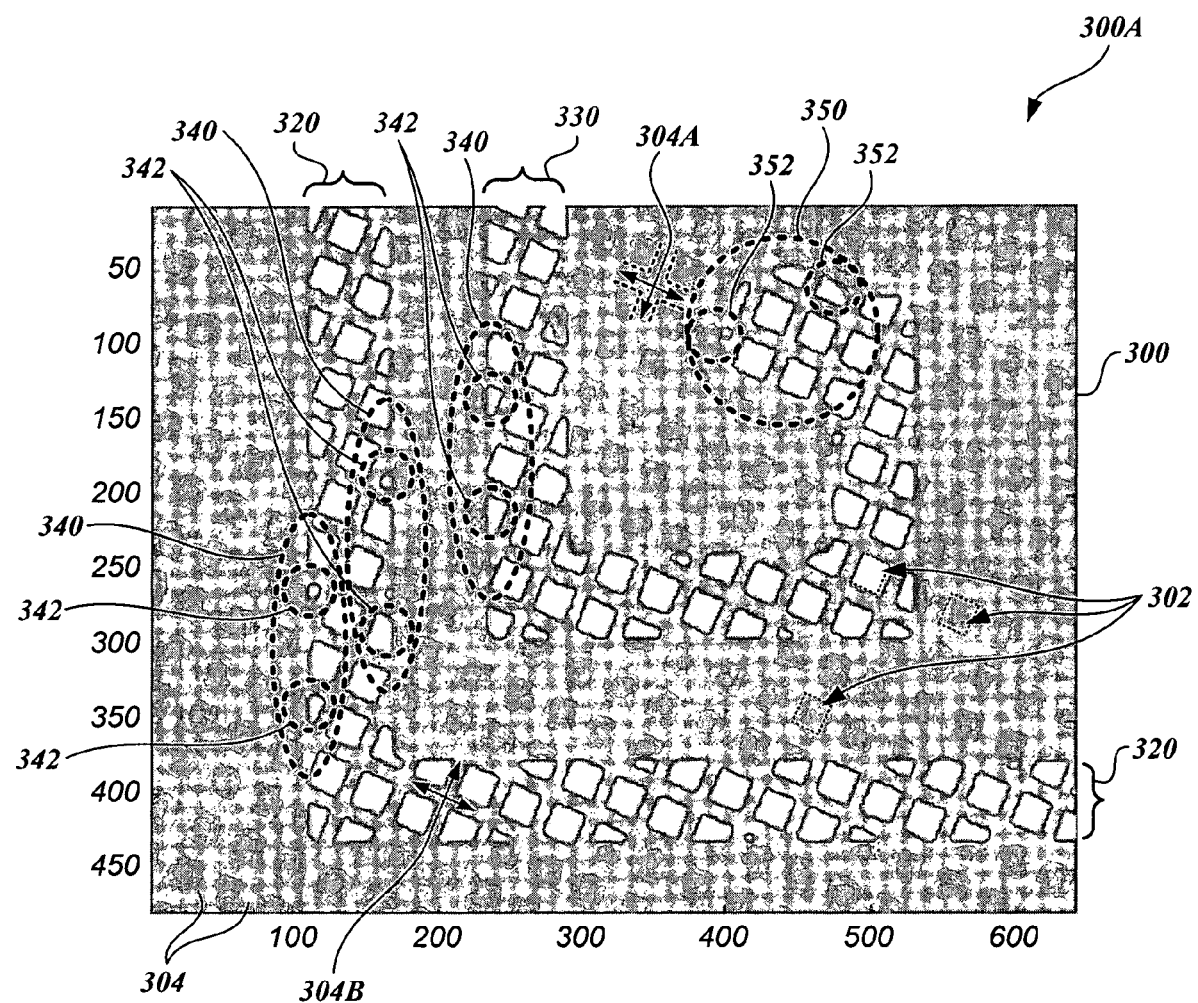
FIG. 3 is a diagram of the exemplary workpiece and feature of FIG. 2 illustrating selected edge portions of the feature.

FIG. 3 is a diagram of a display area 300A showing the exemplary workpiece and feature of FIG. 2 illustrating selected edge portions of the feature. As shown in FIG. 3, the traces 320 and 330 in the display area 300A have been artificially lightened for purposes of illustration, in order to better emphasize the traces 320 and 330 and their edges. The background layer 302 is visible through open sections of the grid 304. It will be appreciated that while a grid type object 304 is discussed herein, the methods of the present invention may be applied to any type of extraneous foreground or background object. A grid portion 304A is shown to be located over a section of the background layer 302, while another grid portion 304B is shown to be located over a section of the trace 320. A series of large ovals 340 are shown to generally surround edge portions of the traces 320 and 330. The large ovals 340 include smaller circles 342 which emphasize portions of the edge sections of the traces 320 and 330 where their edges are actually visible through the occluding grid 304. A circle 350 is also shown to be surrounding a circular end of the trace 330. The circle 350 includes smaller circles 352 which surround and emphasize edge portions of the trace 330 where the edge is actually visible through the occluding grid 304, and which can be utilized for operations such as determining the edge location (e.g., as part of the determination of the radius of an arc or the diameter of the circular end portion of the trace 330).

The image information in the two large ovals 340 on either side of the trace 320 can be utilized, in one embodiment, for operations such as determining the spacing (i.e., width) between the edges of the trace 320. The smaller circles 342 show exemplary regions of valid data for performing this process. It will be understood that while the smaller circles show valid data regions that may be utilized, other valid data regions may also exist within the large ovals 340. As will be discussed in more detail below, it is often not desirable to attempt to reconstruct the location of non-visible portions of the traces, instead it is preferred to obtain precise measurements from the valid data regions that are available. In other words, for the measuring operations, it is not desirable to attempt to reconstruct a visual representation of the complete object, as the extrapolation of any missing portions may in some cases include certain inaccuracies regarding the edges of the object.

Figure 4A:
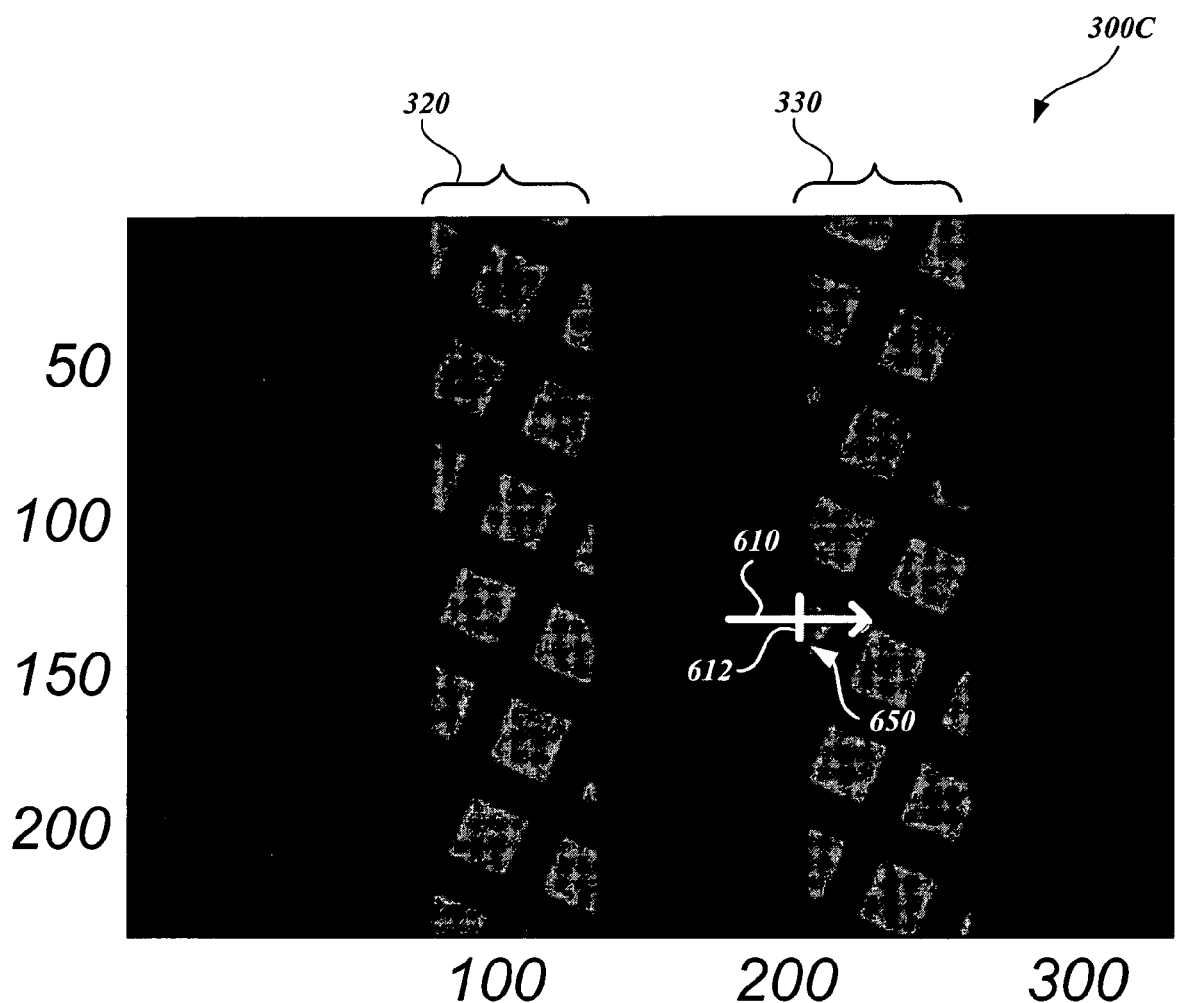
FIG. 4A is a diagram of an enlarged portion of the exemplary workpiece and feature of FIG. 3 further illustrating a line tool used for detecting an edge point of the feature.
Figure 4B:
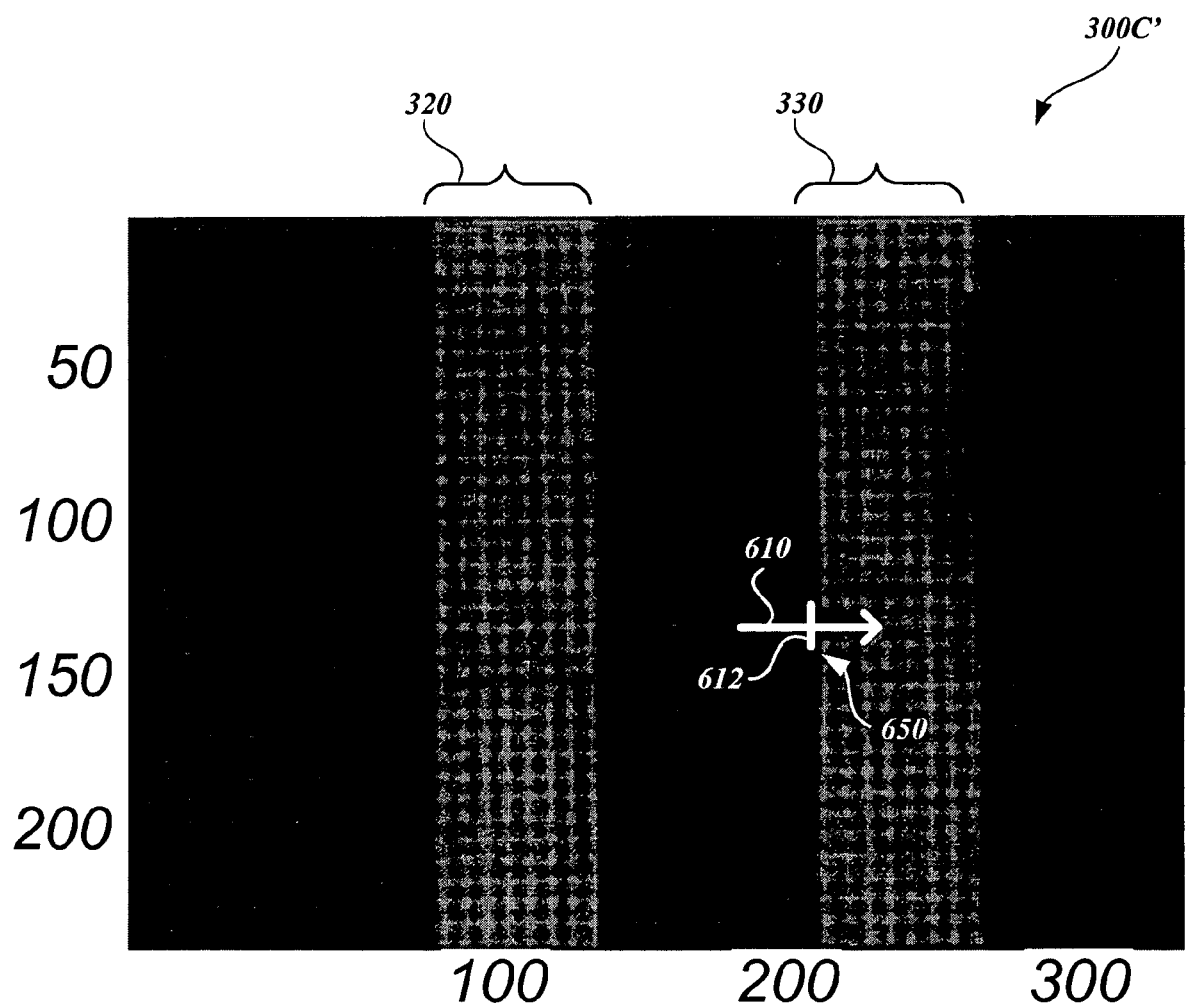
FIG. 4B is a diagram of the enlarged portion of FIG. 4A after a morphology filter has been applied to the workpiece image.

FIG. 4A is a diagram of a display area 300C which shows an enlarged portion of the exemplary workpiece and feature of FIG. 3 and further illustrates a line tool that may used directly for determining the location of an edge point in the workpiece image, or that may underlie the operation of a box-type edge tool, as described further below. FIG. 4B is a diagram of the enlarged portion of FIG. 4A after a morphology filter has been applied to the workpiece image. As shown in FIG. 4B, in the display area 300C', the grid 304 has been effectively removed by the morphology filter, as will be described in more detail below. The display area 300C' may, or may not, be displayed to a user, in various embodiments. In any case, the diagram of the display area 300C' is useful, along with the diagram 300C of FIG. 14A, in illustrating various aspects of the method of the present invention.

During a manual measuring mode or training mode of operation of a vision system, the unaltered workpiece image shown in FIG. 4A will ordinarily be displayed to the user. In diagram 300C, an "occluding feature avoiding" line tool 610 with a selector 612 is shown to be located over a valid edge portion 650, which is located at the left edge of the trace 330. In operation, the user selects the line tool 610 and drags it across the display to place the selector 612 as close as possible to the desired edge of the trace 330 at a valid edge portion 650 of the original unaltered image. Then a morphological filter, described in greater detail below, is defined manually, semi-automatically, or automatically, and applied to remove the grid pattern 304 and produce the filtered image shown in FIG. 4B.

As exemplified in FIG. 4B, where the line tool 610 and the selector 612 are shown at congruent locations to FIG. 4A (that is, locations that have the same image coordinates where they are shown in FIG. 4A), it is desirable that the morphological filter is determined or selected such that the displacement of the desired edge due to filtering is limited to, at most, several pixels. For example, in various embodiments, using known filtering techniques, it is reasonable to expect the edge displacement due to filtering to be on the order of 4-5 pixels or less. The displacement of the edge position in a filtered image depends on several factors, for example: mask size employed in the filter, orientation of filter relative to that of the edge to be detected, etc. When the edge to be detected is rotated relative to the filter and we use a 3×3 mask in the filter, the displacement may be on the order of 4 or 5 pixels or less, which is good enough for many applications. In the case shown in the FIGS. 4A and 4B, a 3×3 mask is used and the desired edge has a similar orientation to the filter mask, that is, they have boundaries that are almost parallel, resulting in an edge displacement of less than 1 pixel in this example. In particular, a dilation operation that replaces each pixel in the 3×3 mask region with the maximum pixel intensity in the mask region is applied to the image of FIG. 4A for a number of iterations that is sufficient to remove the grid 304. In general, the number of iterations that is sufficient depends on the maximum dimension of the occluding object features, e.g.—the dimension of the bars of the grid 304 along the direction of the filter. In the example shown in FIGS. 4A and 4B, the grid bars are 10-15 pixels wide. However, due to their orientation, their maximum dimension along the direction(s) of the simple 3×3 filter mask is significantly larger than their nominal width. Accordingly, 27 iterations of the 3×3 filter were applied to the image of FIG. 4A to remove the grid 304. Regardless of the number of iterations, the same number of iterations of an erosion operation that replaces each pixel in the 3×3 mask region with the minimum pixel intensity in the mask region are then applied, to restore the edges in the filtered image approximately to their original positions. Of course, if the occluding feature is generally lighter, that is, of higher image intensity, than the occluded features to be inspected, then the dilation and erosion operations described above will be performed in the reverse order to remove lighter occluding features.

Following the filtering operations, the line tool 610 is operable, in its ordinary mode of operation, on the filtered image shown in FIG. 4B to roughly, that is, approximately, locate the desired edge of the circuit trace 330. The desired edge location is only approximate at this point because, as noted previously, the filtering process tends to alter the edge locations of the circuit traces 320 and 330 to an extent that is significant relative to precision measurement operations. Thus, in accordance with a next step of the method of the present invention, once the rough edge location is determined, the method then returns to the original unaltered image shown in FIG. 4A, and for the roughly located edge point adjusts the operating parameters of the edge tool 610 to effectively relocate the selector at the determined location of the "filtered" edge point and to effectively shorten the length of the scan line of the line tool 610, such that edge detection is restricted to a close neighborhood of the roughly located edge point. Otherwise, for this part of the process, the line tool 610 operates according to its ordinary edge detection processes, as described in more detail below, on the original image as shown in FIG. 4A. The benefits of the foregoing set of operations are described with reference to FIGS. 5A and 5B.

In operation, generally, the line tool 610 then scans over data points (e.g., pixels) along its length with various operations. As will be described in more detail below with respect to FIGS. 14-15, the scanning over the data points to determine the edge locations is utilized in the method of the present invention for both the rough edge location performed on a filtered version of the image, and then again when the original image data is being evaluated for more precise locating of the edge points. As previously outlined, the length of the scan lines finally utilized for the more precise edge locations in the original image data may be restricted for edge detection in a close neighborhood of the roughly located edge points, and thus finally utilized scan lines are generally made to be shorter than those utilized for the ordinary operation of the tool, and the rough edge location in the filtered image.

Figure 5A:
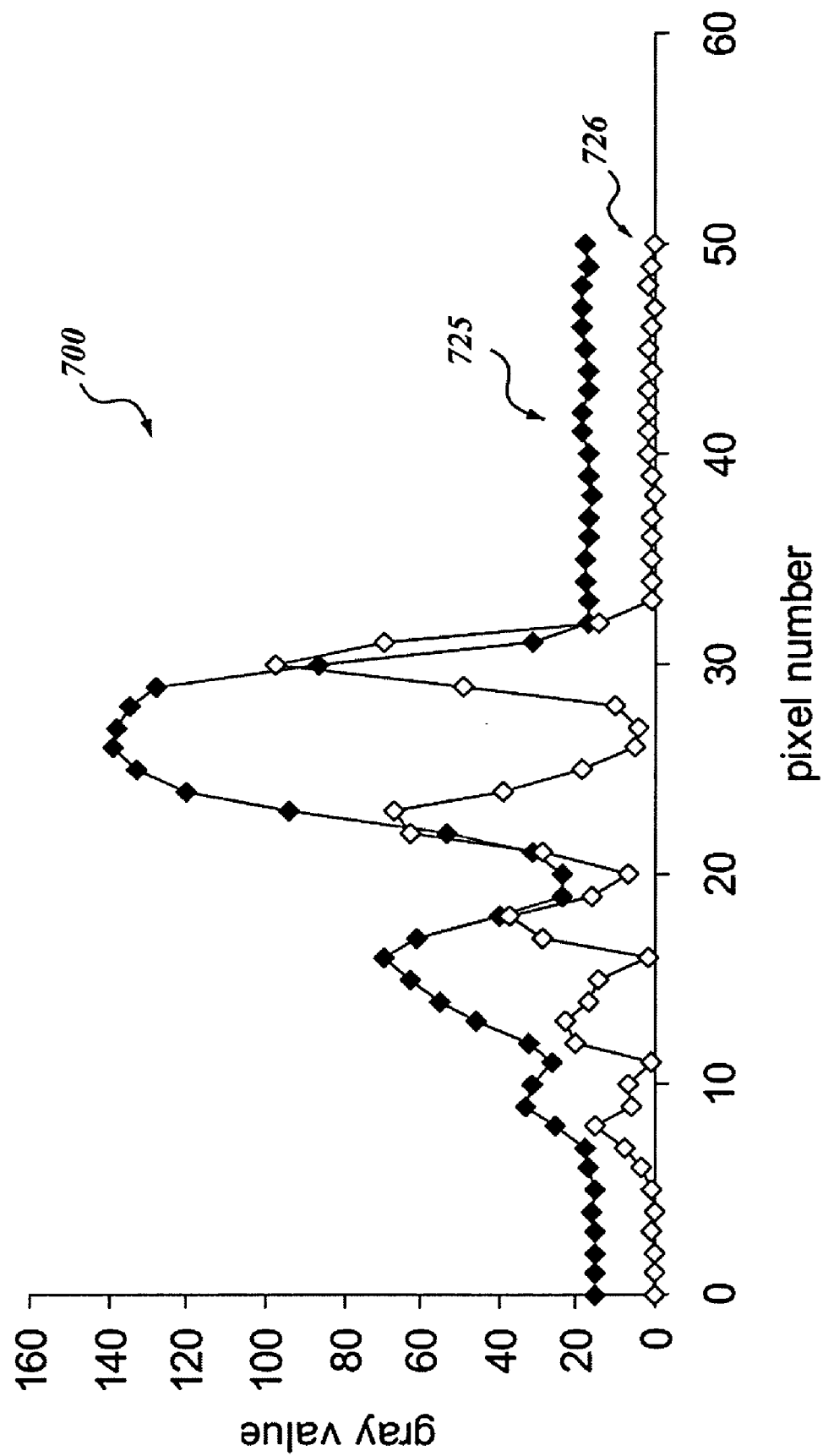
FIG. 5A is a diagram of image intensity values obtained across the line tool of FIG. 4A, and the related gradients.
Figure 5B:
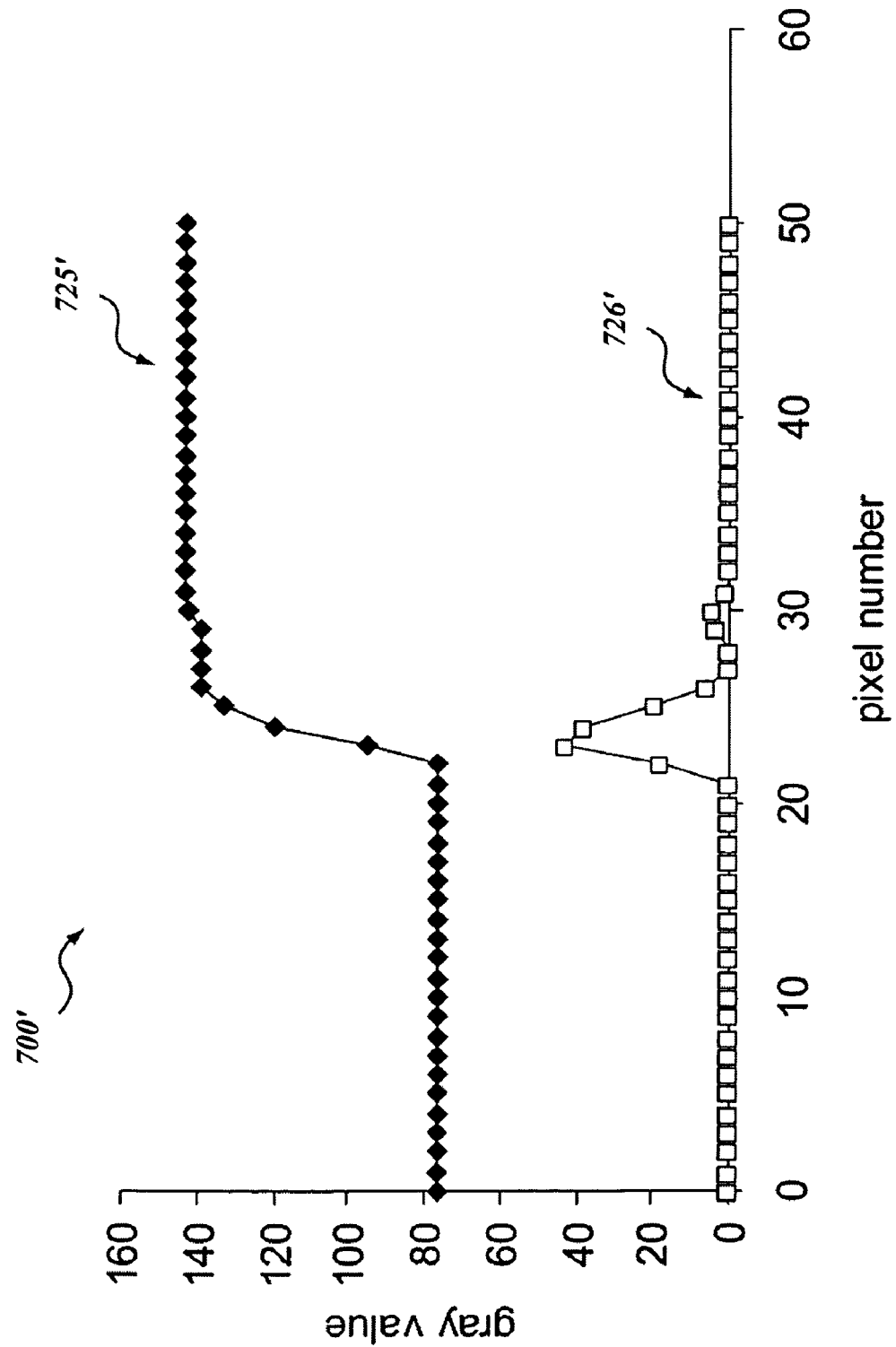
FIG. 5B is a diagram of image intensity values obtained across the line tool of FIG. 4B, and the related gradients.

FIG. 5A is a diagram of a graph 700 showing image intensity (gray) values 725 obtained across the length of the line tool 610 in FIG. 4A. FIG. 5B is a diagram of a graph 700' showing filtered image intensity (gray) values 725' obtained across the line tool 610 in FIG. 4B. The gradient magnitude values 726 and 726' derived from the intensity values 725 and 725' respectively, are also shown for reference in FIGS. 5A and 5B, respectively. As shown in FIG. 5B, the data points across the line tool 610 are referenced as pixel numbers from 0-50 along the horizontal axis. Beginning from data point 0, the image intensity values initially indicate a relatively darker region up to approximately data point 23, which is then followed by a relatively lighter region up to data point 50.

For determining the location of an edge in an image, many algorithms find the edge location by locating the maximum gradient magnitude within the intensity data. If there are multiple gradients along the intensity data (e.g., as frequently occurs when the grid 304 has not been removed from the display area, as shown in FIG. 5A, and as frequently occurs for the evaluation performed in the more precise edge location performed in the latter part of the method of the present invention), then the location of the selector 612 can help the algorithm determine which gradient corresponds to the desired edge. An indication (e.g., the orientation or direction of the tool 610) can also be provided for helping the algorithm determine whether it should be looking for a rising or a falling edge. In FIG. 5B, the maximum gradient criterion clearly indicates that the edge point is located at approximately data point 23. It should be appreciated that the complex set of image intensity variations (edges) shown in FIG. 5A, associated with the grid edges and other shadows in FIG. 4A, are not present in the filtered image intensity values shown in FIG. 5B. Thus, detection of the desired edge in the filtered image is both simple and reliable. A rising edge is also indicated, with reference to the direction of the line tool 610, as indicated by its arrowhead.

Now, returning to FIG. 5A, allowing plus or minus 4-5 pixels for potential edge displacement in the filtered image, and assuming that it is desirable to include approximately 4-5 pixels on each side of the edge location in order to reliably identify the edge location with good precision using a maximum gradient technique, we can restrict the "scan line" length in FIG. 4A to approximately plus or minus 10 pixels around the determined "filtered" edge location at pixel number 23 along the scan line. Thus, only the data corresponding to approximately pixel numbers 13-33 needs to be acquired and analyzed in original image, and the parameters of line tool 610 are modified accordingly to govern its operations. There appear to be two potential rising edges identified between pixel numbers 13-33, as indicated by the maximum gradient data, at pixel 13 and at pixel 23. However, since we can assume that the edge location should not vary by more than plus or minus 4-5 pixels between the filtered and original images, we can rule out the edge at pixel 13 and determine the edge location to be near pixel 23.

It should be appreciated that the edge location (the maximum gradient location) is actually found with a sub-pixel level of precision, by finding the interpolated maximum gradient location, using known curve fitting techniques or known centroid finding techniques that identify the centroid of the area under the gradient curve that surrounds the maximum gradient value, or the like. Also, in training mode, various characteristics of the edge near pixel 23 are determined and stored, to facilitate an even more reliable selection and determination of the desired edge on a similar part, later, in run mode. Such characteristics may include the overall valley-to-peak intensity variation surrounding the edge, for example between the local minimum pixel 20 and the local maximum pixel 26 (or some proportion thereof); the nominal intensity value at the edge location; and/or a ratio between these two values, or the like.

Figure 6:
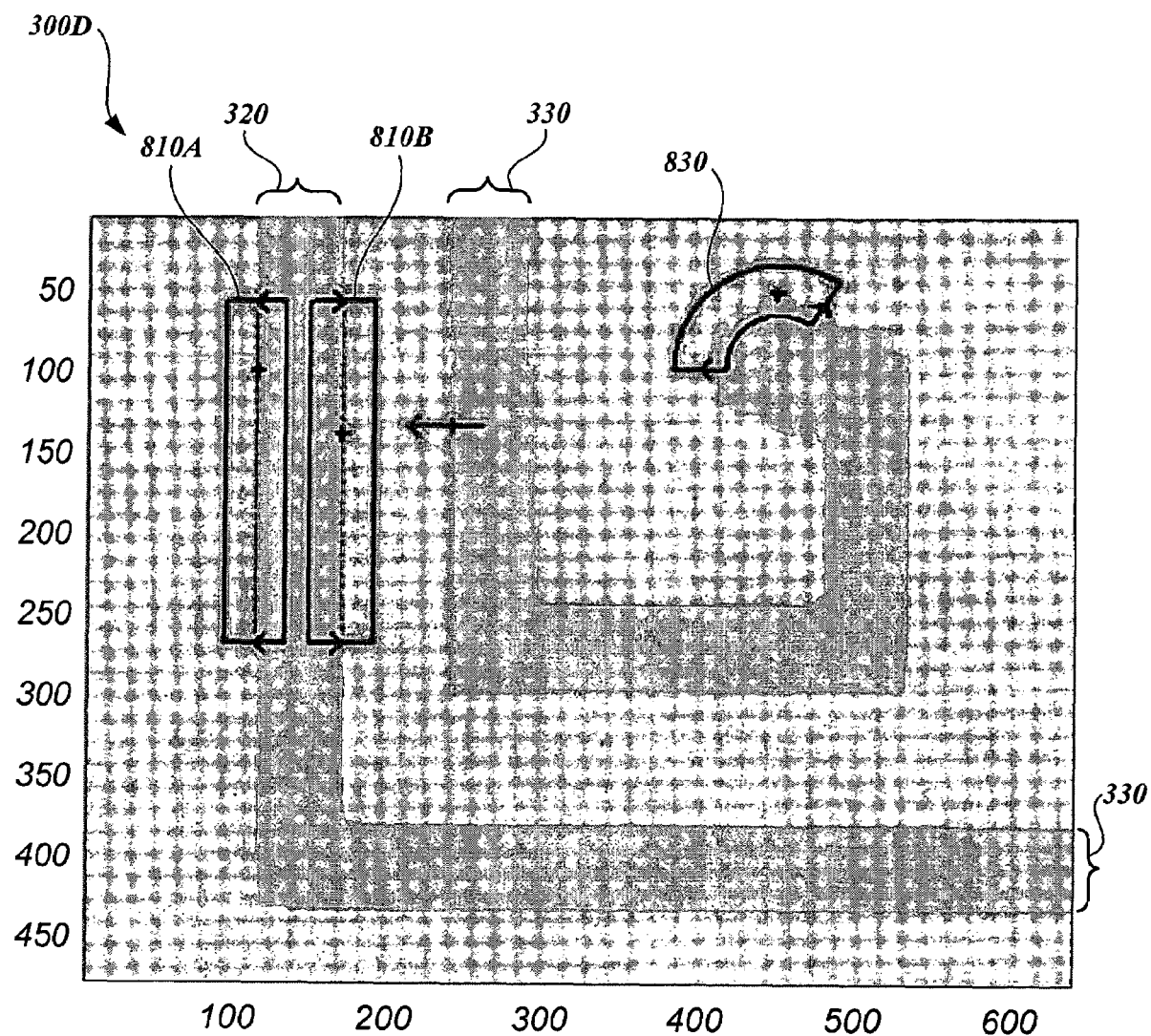
FIG. 6 is a diagram of the exemplary workpiece and feature of FIG. 3 after morphological filtering, along with superimposed exemplary embodiments of GUI widgets representing box, arc, and point tools for edge location.

FIG. 6 is a diagram of a display area 300D which shows the exemplary workpiece and various features to be inspected of FIG. 3 after morphological filtering, along with exemplary embodiments of GUI widgets representing box, arc and point tools for edge location superimposed on the filtered image in a manner analogous to that shown in FIG. 4B, all usable in various embodiments of the systems and methods according to this invention. As shown in FIG. 6, the display area 300D includes box tool widgets 810A and 810B, a line tool widget 820, and an arc tool widget 830. In various exemplary embodiments, these video tools 810-830 are positioned on the original image by the user, used on the filtered image with predefined default settings, and finally used on the unfiltered original image. In various exemplary embodiments, these settings are adjusted or redefined by a user, but need not be redefined in order to use the tool. In various exemplary embodiments, the tools are employed with the alternative predefined selectable settings. Various operating characteristics of edge detection tool GUI widgets are generally described in the QVPAK 3D CNC Vision Measuring Machine Users Guide and the QVPAK 3D CNC Vision Measuring Machine Operation Guide, which were previously incorporated herein by reference.

In various exemplary embodiments, the box tool widgets 810A and 810B are displayed as boxes with arrows along the side and a selector in the center. In various exemplary embodiments, the box tool widgets 810A and 810B are sized, positioned and rotated by an operator, until the box is indicative of, or defines, the region of interest, and the arrow is indicative of an edge to be determined and inspected. In various exemplary embodiments, the box tool widgets 810A and 8101B generally use one or more conventional edge gradient(s) along the edge in the region of interest, and the edge is determined based on the location of the selector during a manual or training mode of operation and the local magnitudes of the edge gradient(s) along various scan lines, as outlined above. The direction of the arrow defines a reference direction or polarity to be associated with the edge gradient in these various exemplary embodiments. It should be appreciated that the extents of the region of interest indicated by the boundaries of the box tool widgets 810A and 8101B are fully adjustable and rotatable, when desired. The line tool widget 820 operates as previously described for the line tool 610 of FIGS. 4A and 4B, while the arc tool widget 830 determines edge points defining a curve (e.g., a radius) for an image feature.

In a "mask mode" of operation that avoids extraneous and occluding features according to this invention, both the arc tool widget 830 and the box tool widgets 810A and 810B include operations similar to those of the line tool widget 610 (or 820), in that the desired edge characteristics that are used throughout the region of interest of the box tool are determined based on an initial scan line which coincides with the location of the selector just as for the line tool 610, as described above. Thus, during learn/training/teach mode, the user must locate the selector along a valid edge portion, such as the valid edge portion 650 previously described with reference to FIG. 4A. As will be described in more detail below with reference to FIG. 8, in a manual measuring mode, or run mode, the operation of the box tool widgets 810A and 810B and the arc tool widget 830 then consist of the use of multiple scan lines, as though each were an instance of a line tool (such as the line tool 610), with the operable edge screening parameters (in addition to the maximum gradient criterion) for all scan lines being those determined along the single scan line corresponding to the selector during the learn/training/teach mode.

Figure 7:
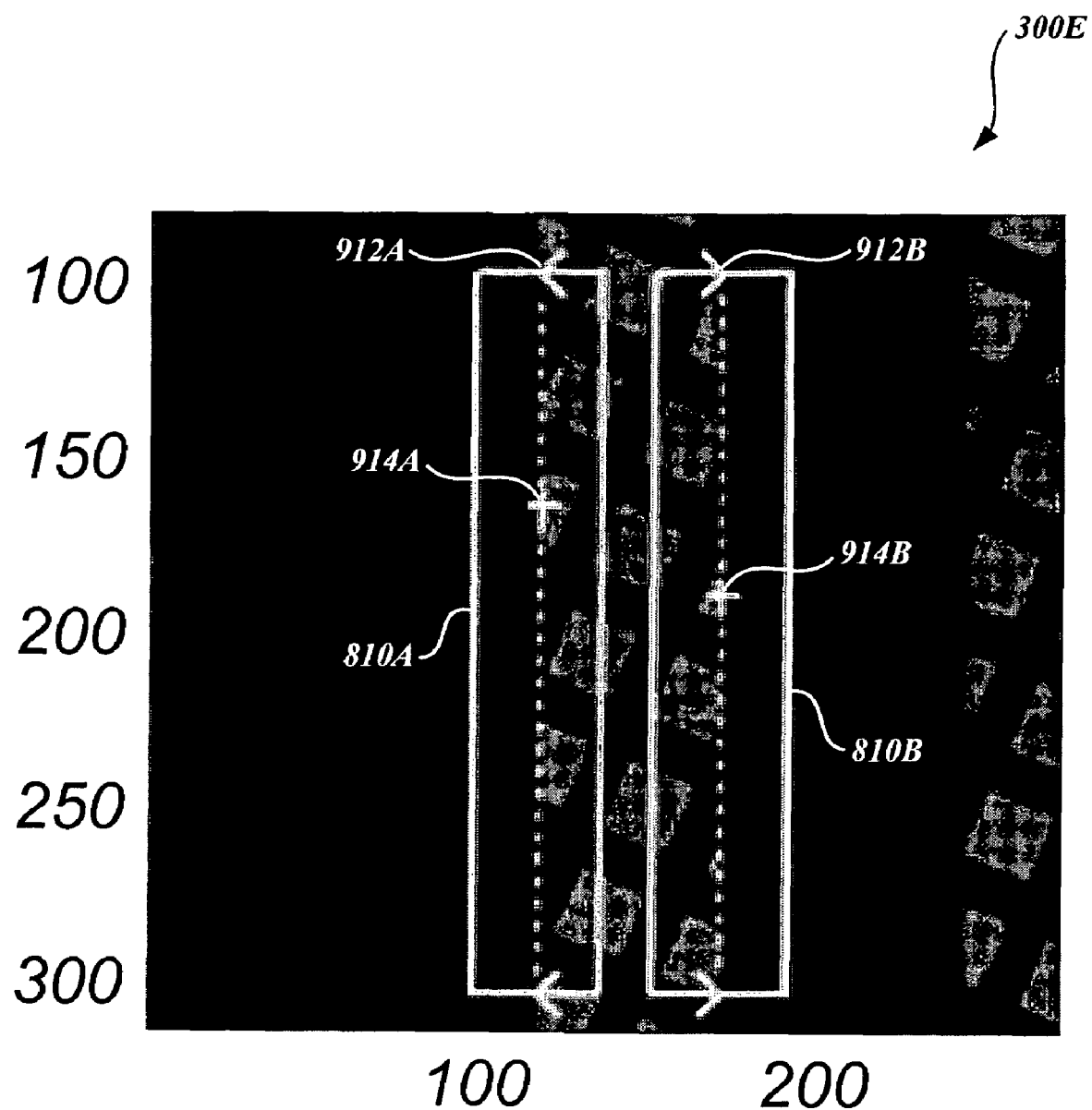
FIG. 7 is a diagram of an enlarged portion of the exemplary workpiece and feature of FIG. 6 including the box tools.

FIG. 7 is a diagram of a display area 300E which shows an enlarged portion of the display area of FIG. 6 further illustrating the box tool widgets 810A and 810B. As shown in FIG. 7, the box tool widgets 810A and 810B include orientation arrows 912A and 912B that correspond to the orientation arrowhead of the line tool 610. The selectors 914A and 914B operate similarly to the selector portion 612 of the line tool 610, and respectively govern the operations of a respective initial scan line that is used for determining various edge parameters used throughout the region of interest of the respective box tool, as described above. Alternatively, a box tool widget may include a feature that allows the user "request" one or more additional selectors, and position them at additional positions along valid edge portions. Then corresponding edge parameters determined based on the plurality of scan lines associated with the plurality of selectors may be averaged, or otherwise appropriately combined. Such averaging will make the learned edge parameters less susceptible to potential local variations along the edge in the region of interest. Thus, operation of such a box tool is likely to be more robust.

Figure 8:
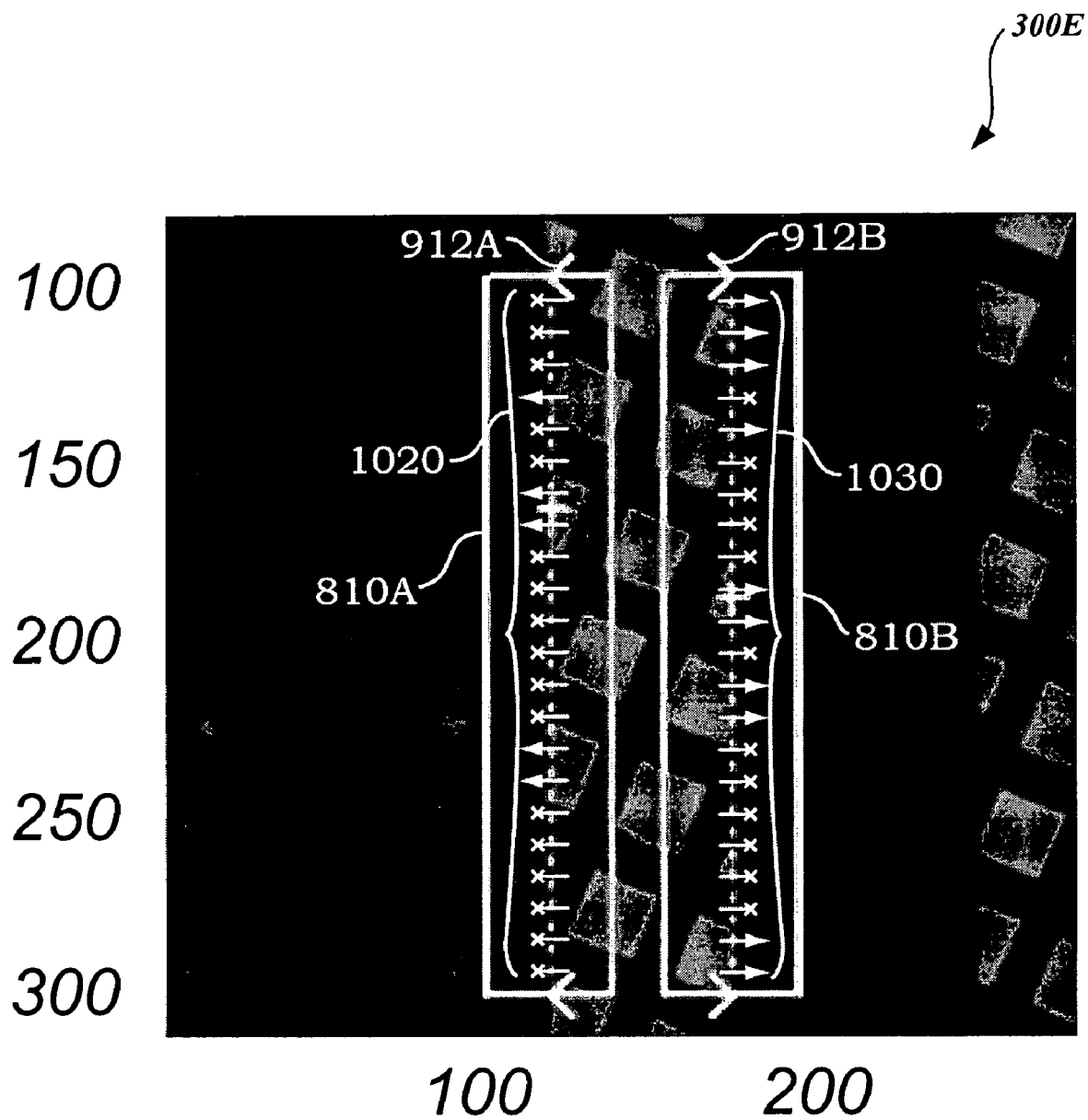
FIG. 8 is a diagram of the enlarged portion of FIG. 7 further illustrating the operation of the box tools shown in FIG. 7.

FIG. 8 is a diagram of the display area 300E of FIG. 7, further illustrating the operation of the box tools 810A and 810B using multiple scan lines but effectively avoiding or masking the effects of the occluding grid 304. Various considerations for such scan lines may include the spacing, secondary scan line qualifications (e.g., the number of continuous pixels is a scan line), and other factors. In one embodiment, the spacing of the scan lines may be programmable either as a customizable default, or can be determined in each instance, in some cases utilizing a mechanism such as a user utilizing a sub-menu to alter the spacing.

In the display area 300E, because there are so few valid data regions, it is desirable to have the scan lines relatively closely spaced (e.g., every one or two rows of pixels). The scan lines that identify the locations of valid edges according to this invention are those with arrows. The scan lines that identify no valid edges according to this invention are those with "X's". As previously outlined, in addition to sufficiently matching the edge location in the filtered image and meeting maximum gradient criteria or the like, any candidate edge along any scan line must also match the edge parameters determined during training or learn mode for the known valid edge along the initial scan line that coincides with the selector at training or learn mode time. This effectively eliminates any edges associated with occluding features, shadows, or the like.

Figure 9:
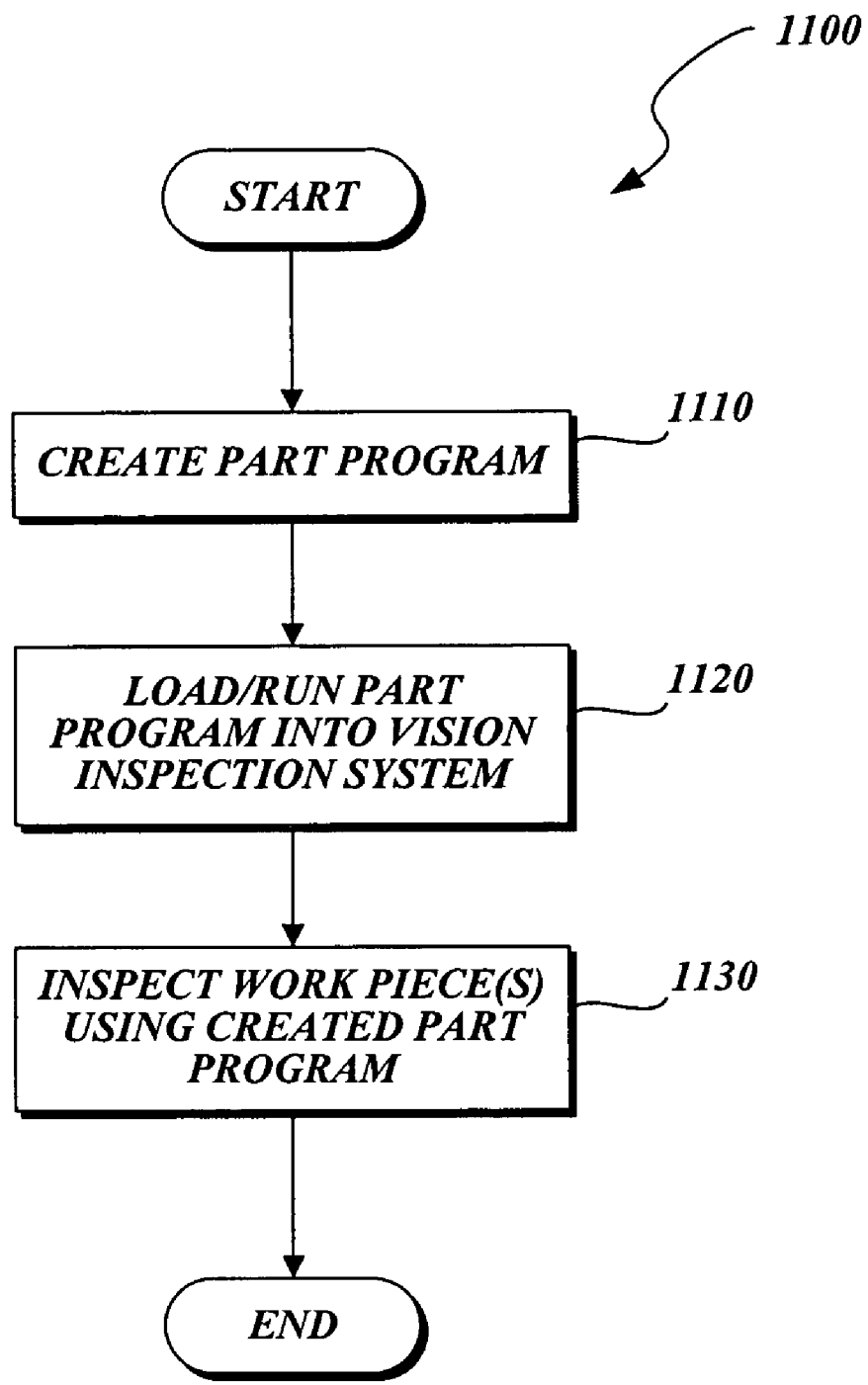
FIG. 9 is a flow diagram illustrative of one exemplary embodiment of a routine for programming and running a part program for a general purpose precision machine vision system.

FIG. 9 is a flow diagram illustrating one exemplary embodiment of a routine 1100 for creating and using a part program to inspect a workpiece having a region of interest. At a block 1110, a part program is created which is usable to inspect the portion of the workpiece having the region of interest. At a block 1120, the created part program is run. At a block 1130, a number of workpieces that are similar to the first workpiece are inspected using the part program.

Figure 10:
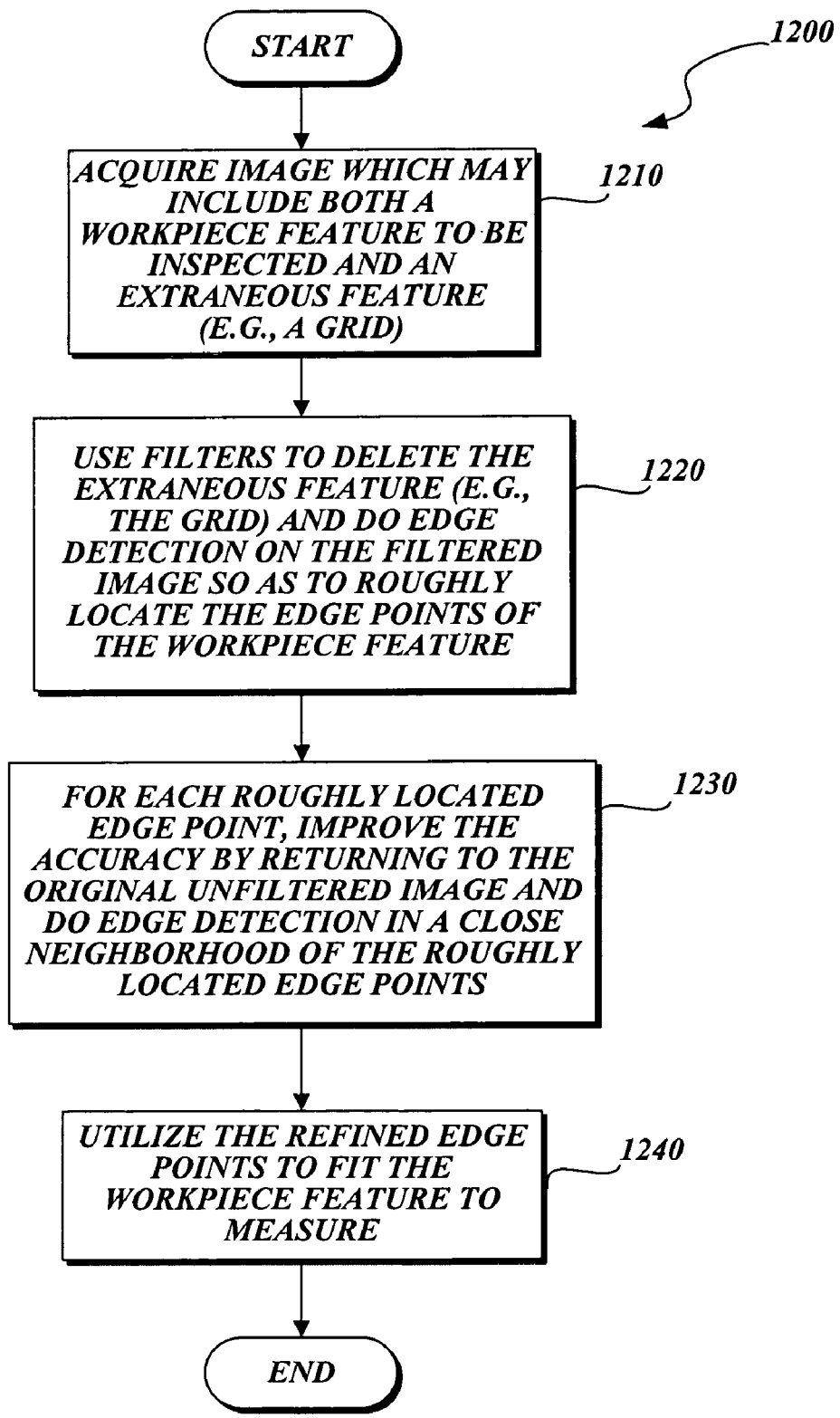
FIG. 10 is a flow diagram illustrative of one exemplary embodiment of a routine for inspecting a workpiece with occluded features.

FIG. 10 is a flow diagram illustrative of one exemplary embodiment of a routine 1200 for inspecting a workpiece feature that is occluded by an extraneous feature in accordance with the present invention. At a block 1210, an image is acquired which may include both the occluded workpiece feature to be inspected and the extraneous occluding feature (e.g., a grid). At a block 1220, filters (e.g., morphology filters) are utilized to delete the extraneous feature (e.g., the grid), and then edge detection is performed on the filtered image so as to roughly locate the edge points of the workpiece feature. In one embodiment, the morphology filters that are used may be closing or opening with a 3×3 square mask or a 5×5 disc mask. By using this type of filter configuration, the method can be performed in a relatively expedient manner. At a block 1230, for each roughly located edge point, the accuracy of the edge location is improved by returning to the original unfiltered image and doing edge detection in a close neighborhood of the roughly located edge points. At a block 1240, the refined edge points are utilized to fit, inspect and/or locate the workpiece feature. As will be discussed in more detail below, it will be appreciated that the routine 1200 of FIG. 10 is usable in both a training mode and in a run mode.

It should be noted that in contrast to certain known systems where a user has previously been required to carefully position multiple point tools or the like, selectively, over the occluded feature edge points as recognized by the user, the present system is easier to use. It should be appreciated that according to this invention, in various embodiments a general box tool, and/or other such efficient multi-point tools, can be generally positioned over a region which includes both the occluded feature (e.g., a workpiece feature) and the occluding feature (e.g., a grid). Thus, the user is allowed to employ such more-efficient multi-point tools in their normal manner, without special consideration of the occluding features which may be present.

Figure 11:
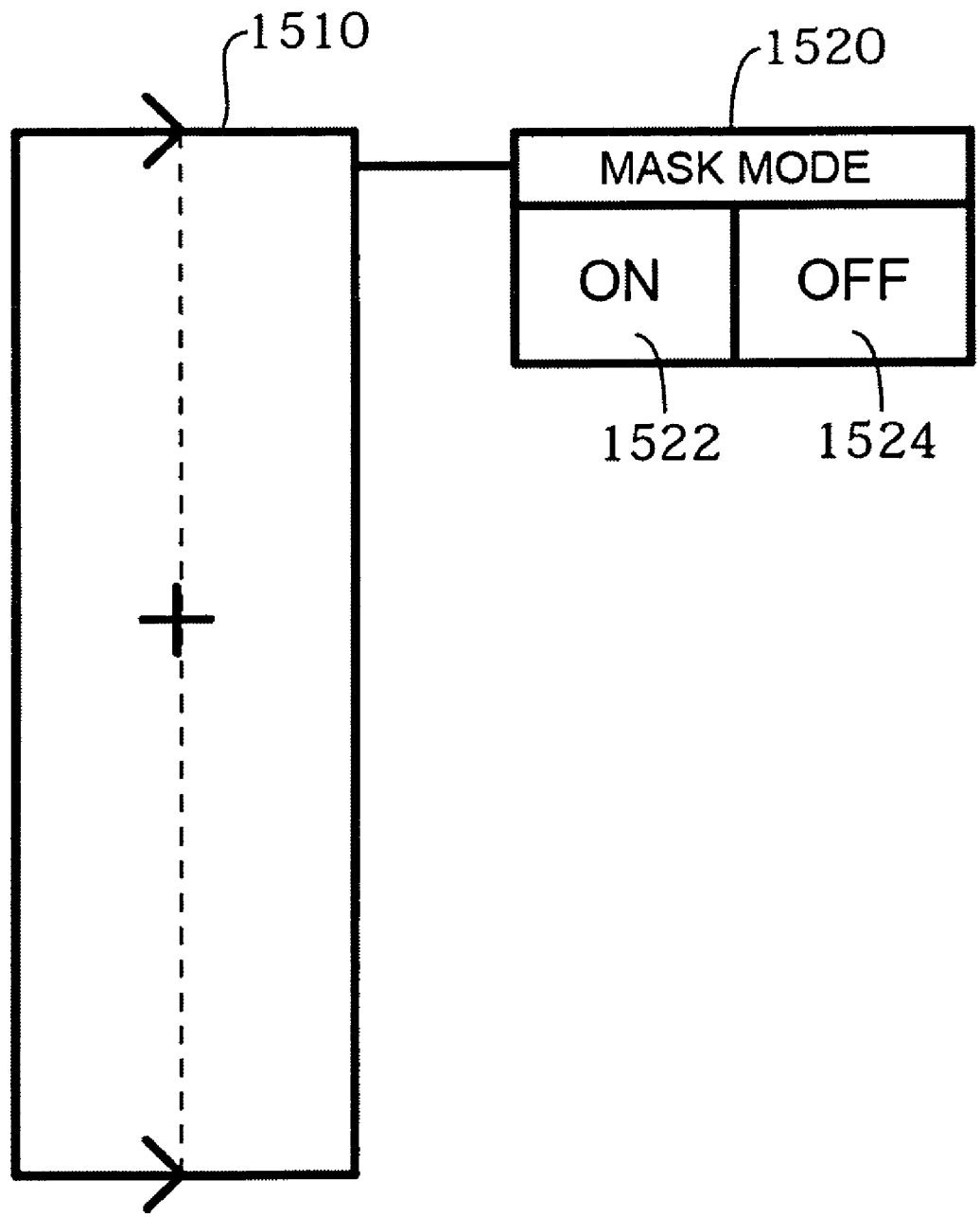
FIG. 11 is a diagram of an exemplary embodiment of a GUI box tool widget and a control widget usable to select a mask mode and operations for measuring occluded features.

FIG. 11 shows an exemplary embodiment of a box tool GUI widget 1510, along with an exemplary embodiment of a control widget 1520 usable to select a mask mode that effectively avoids occluding feature edges during operations associated with edge detection according to this invention, in a training mode or manual mode of machine operation. As will be discussed in more detail below, the "mask mode" may be associated with the methods of the present invention in that when a mask mode is selected, the method for measuring occluded features using various operations outlined above is utilized. In various exemplary embodiments, the control widget 1520 includes an on button 1522 and an off button 1524. When the on button 1522 is clicked on with a mouse or is otherwise actuated, it initiates automatic operations such that a method for measuring occluded features such as that illustrated by the routine 1200 of FIG. 10 is performed. Other tools may be provided with similar control widgets 1520. Of course the control widget 1520 can be represented in many other forms, divided, included within more complex multi-function widgets, or included directly within a video tool representation, or the like. The essential aspect of the widget 1520 is that it is usable to activate or deactivate an operating mode for measuring occluded features such as that illustrated by the routine 1200 according to this invention.

In various exemplary embodiments a demonstration mode related to the measuring of occluded features may be provided. In such embodiments, a control widget 1520 may be clicked on with a mouse or otherwise actuated to initiate automatic operations that provide a learn or training mode demonstration that displays the filtered image for evaluation, and/or previews or mimics the results of comparable run mode operations, or the like, for example as will be described in more detail below. Such a demonstration may be evaluated by a machine operator to confirm or reject its efficacy and the associated programming parameters or instructions.

In various other exemplary embodiments, within a context of operation where the mode for measuring occluded features is already currently or continuously in operation, a control widget 1520 may be clicked on with a mouse or otherwise actuated to accept the settings of a fully defined or trained measuring of occluded features operation, for example, or to bypass a training mode demonstration, or to accept the results indicated by an evaluation image provided as a result of a training mode demonstration, in order to move on to additional training mode operations. In other words, the operation of a control widget 1520 may depend on whether there is a higher level or background command in effect, that has already set the machine in a mode for measuring occluded features according to this invention. For example, such a mode may be appropriate when an extraneous feature covers most or all of an image including multiple features or regions to be inspected (e.g., the repetitive grid pattern 304, or the like). It should be appreciated that, in various exemplary embodiments, various aspects of the previously described tools and widgets may be implemented separately or in various combinations. Furthermore, it should be appreciated that, in various exemplary embodiments, alternative forms of the various GUI widgets and controls are apparent. Therefore, the foregoing embodiments are intended to be illustrative only, and not limiting.

Figure 12:
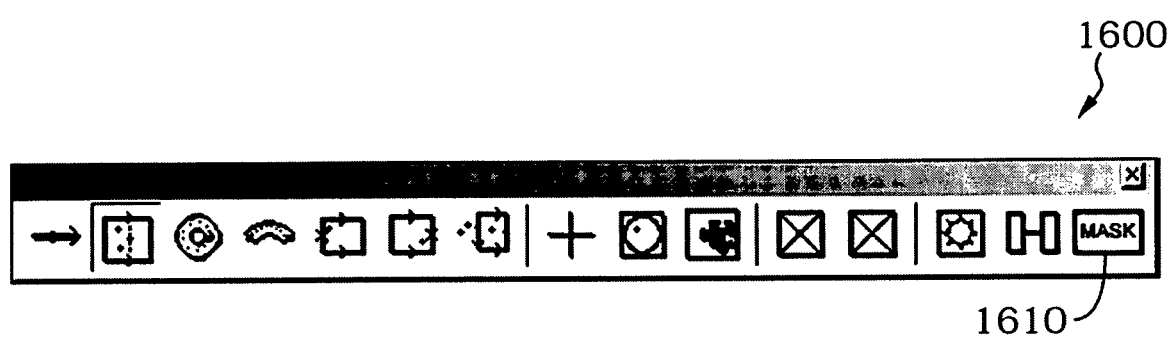
FIG. 12 is a diagram of an exemplary embodiment of a GUI toolbar window which includes a mask mode button or widget for measuring occluded features.

FIG. 12 illustrates one exemplary embodiment of a graphical user interface toolbar window 1600 which includes a mask mode selector 1610 usable for selecting a mode for measuring occluded features according to this invention. The remainder of the toolbar window 1600 is similar to that provided in the QVPAK™ software discussed above. In one embodiment, the mask mode selector 1610 which is used for selecting the mode for measuring occluded features may be dragged onto an image for a global mask mode or onto an individual tool for a tool-specific mask mode. In one embodiment, the tools may have widgets that reflect when they are in a mask mode. In a second embodiment, the mask mode selector 1610 may remain on the toolbar 1600 and provides a toggling function. When the mask mode selector 1610 is toggled on, a video tool is dragged off of the tool bar 1600 and is in a mask mode, and may be provided with a visual feature that indicates that it is in the mask mode. In one embodiment, the user interface is be able to support a semi-automatic method of the measuring of occluded features mode, in which case when the mask mode is activated, the tool may query the user to select the semi-automatic technique, or displays an example of the results of several alternatives for the user to select from.

Figure 13:
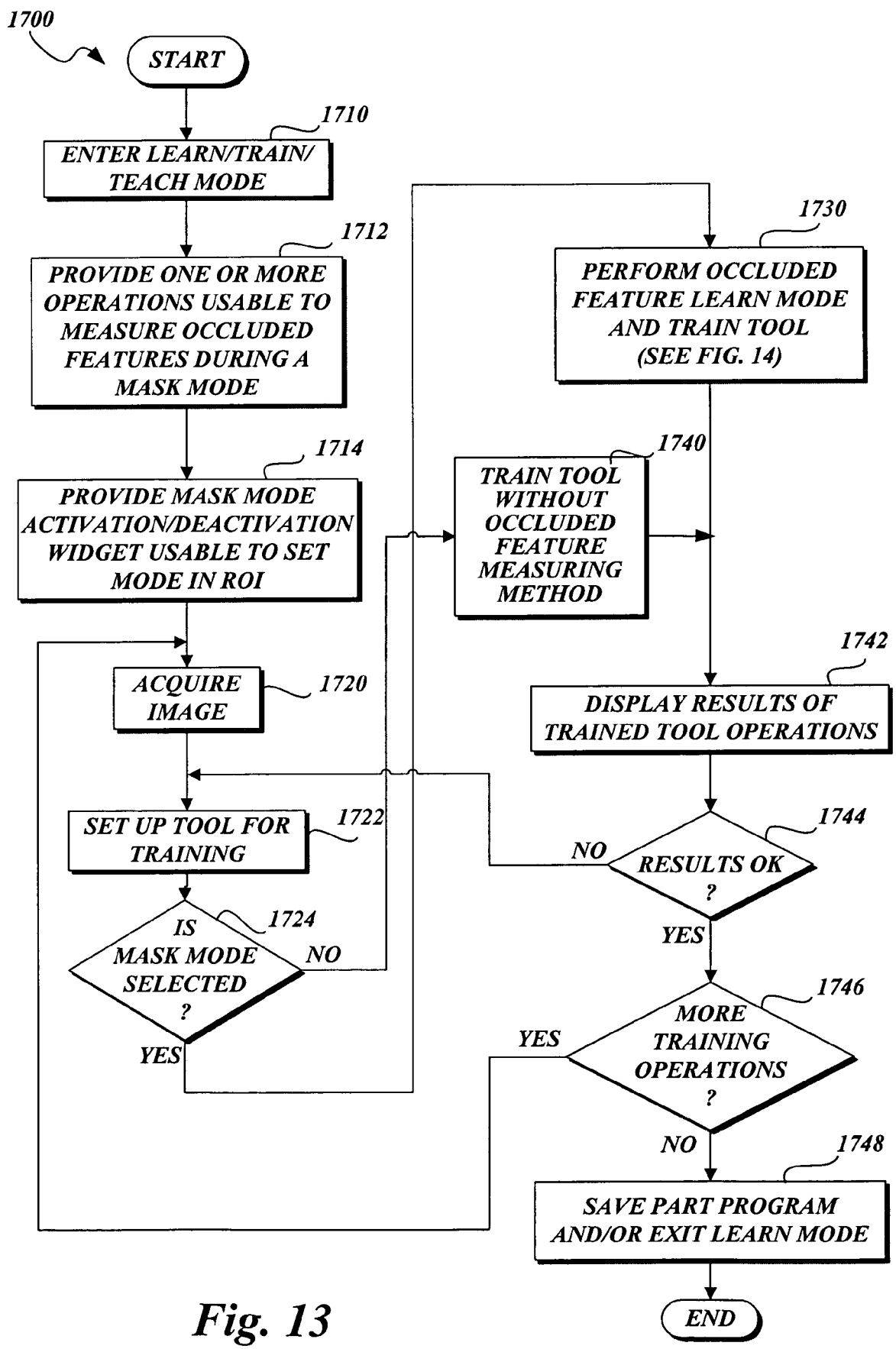
FIG. 13 is a flow diagram illustrative of one exemplary embodiment of a routine for executing a learn/train/teach mode in which a mask mode may be selected for measuring occluded features.

FIG. 13 is a flow diagram illustrative of one exemplary embodiment of a routine 1700 for performing learn mode operations with reference to a mask mode widget. At a block 1710, the learn/training/teach mode is entered. At a block 1712, one or more operations are provided that are usable to measure occluded features during the mask mode. At a block 1714, a mask mode activation/deactivation widget (as described in FIGS. 11 and 12) is provided that is usable to set the mode in the region of interest.

At a block 1720, the image is acquired. At a block 1722, the tool is set up for training. At a decision block 1724, a determination is made as to whether the mask mode has been selected. If the mask mode has not been selected, then the routine continues to a block 1740, where the tool is trained without the occluded feature measuring method. If the mask mode has been selected, then the routine continues to a block 1730, where an occluded feature learn/train/teach mode is performed, as will be described in more detail below with respect to FIG. 14.

From either block 1730 or 1740, the routine continues to a block 1742, where the results of the trained tool operations are displayed. At a decision block 1744, a determination is made as to whether the current results of the trained tool are acceptable (e.g. was the expected edge found, is its location approximately as expected, etc.). If the current results are not acceptable, then the routine returns to block 1722. If the current results are acceptable, then the routine continues to a decision block 1746.

At decision block 1746, a determination is made as to whether more training operations will be performed. If additional training operations are to be performed, then the routine returns to block 1720. If additional training operations are not to be performed, then the routine continues to a block 1748, where the part program is saved and/or the learn mode is exited.

Figure 14A:
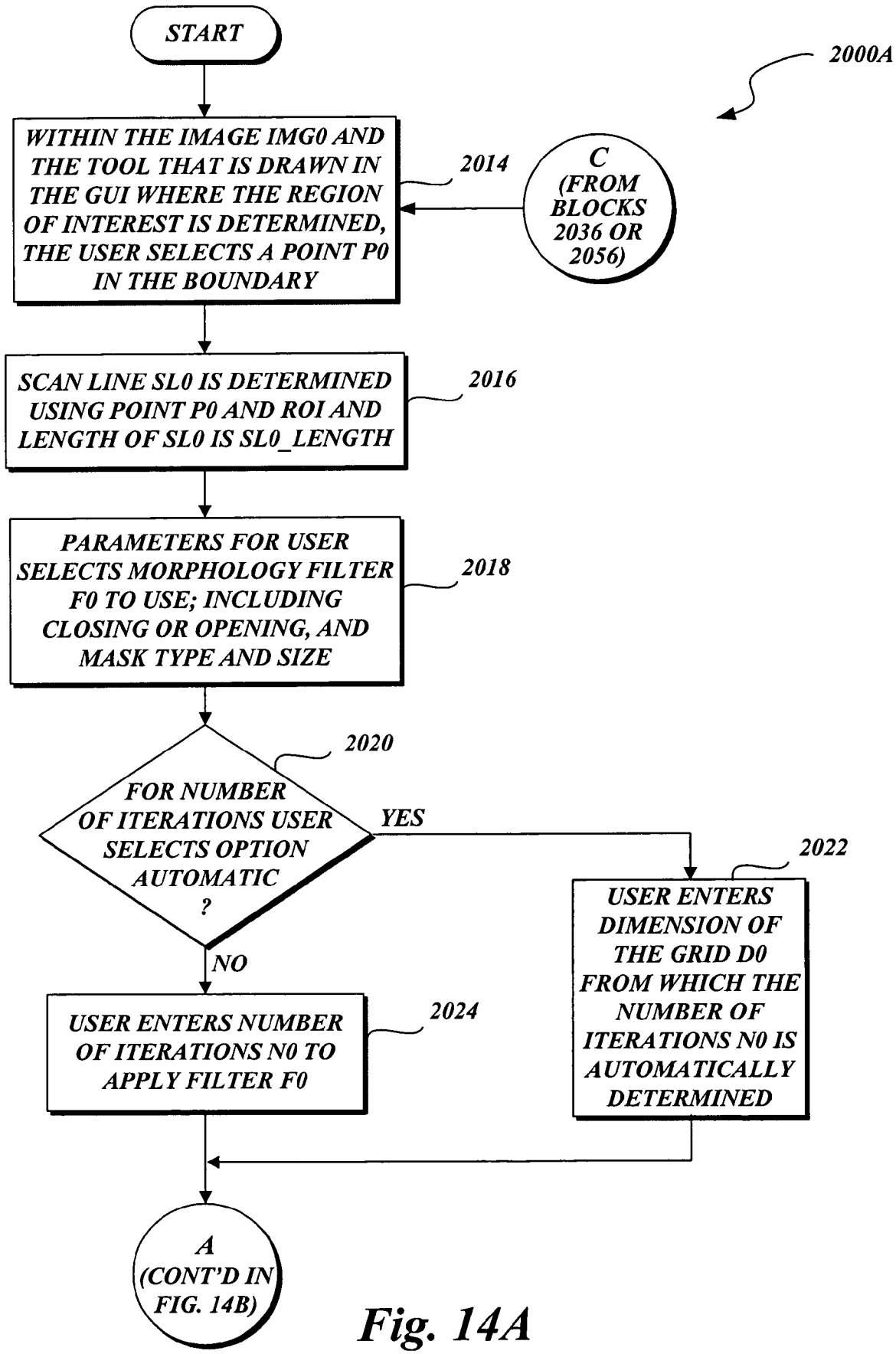
FIGS. 14A-14C are flow diagrams illustrative of one exemplary embodiment of a specific routine for executing operations to detect an occluded feature in a learn/train/teach mode.
Figure 14B:
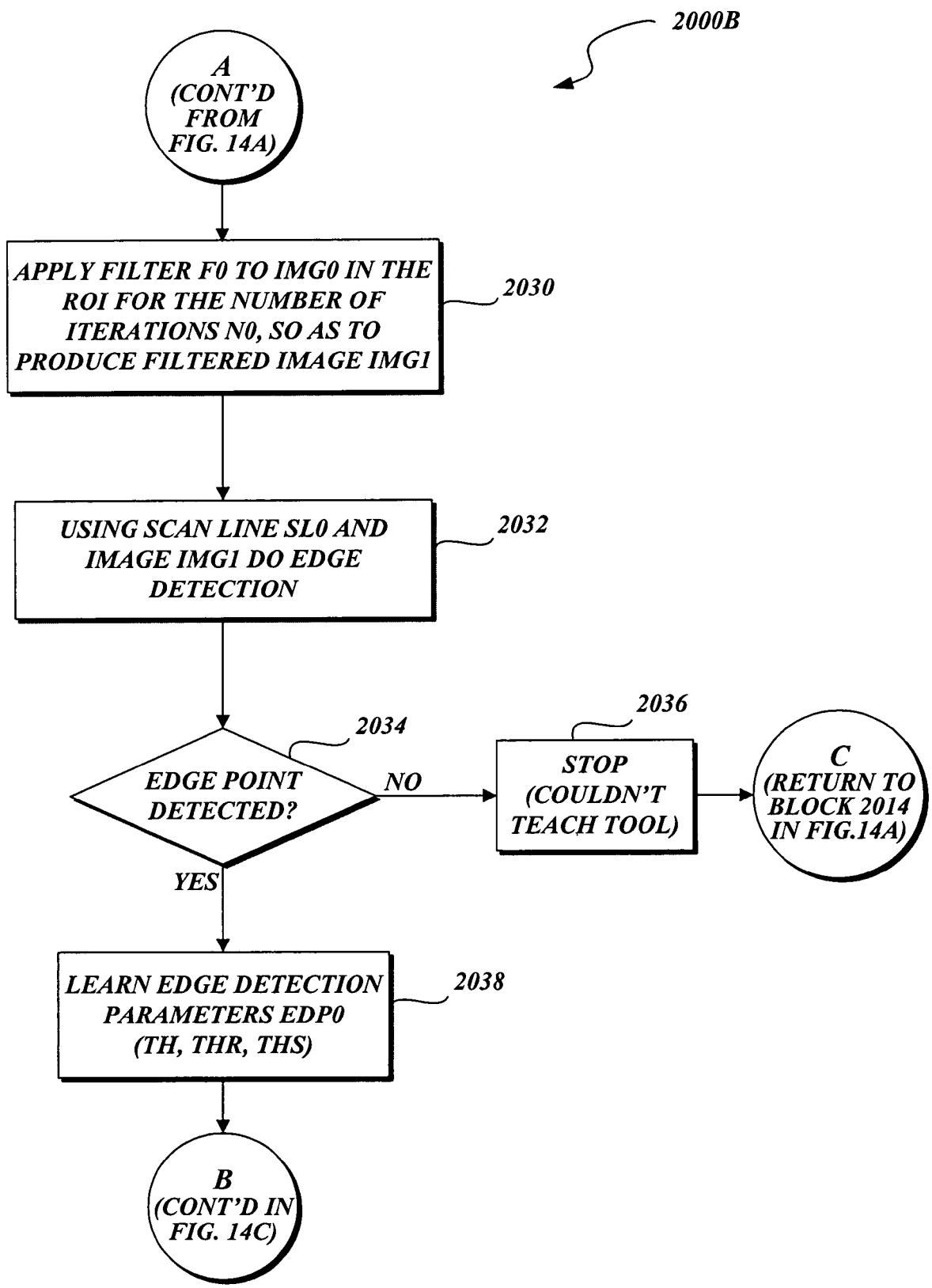
Figure 14C:
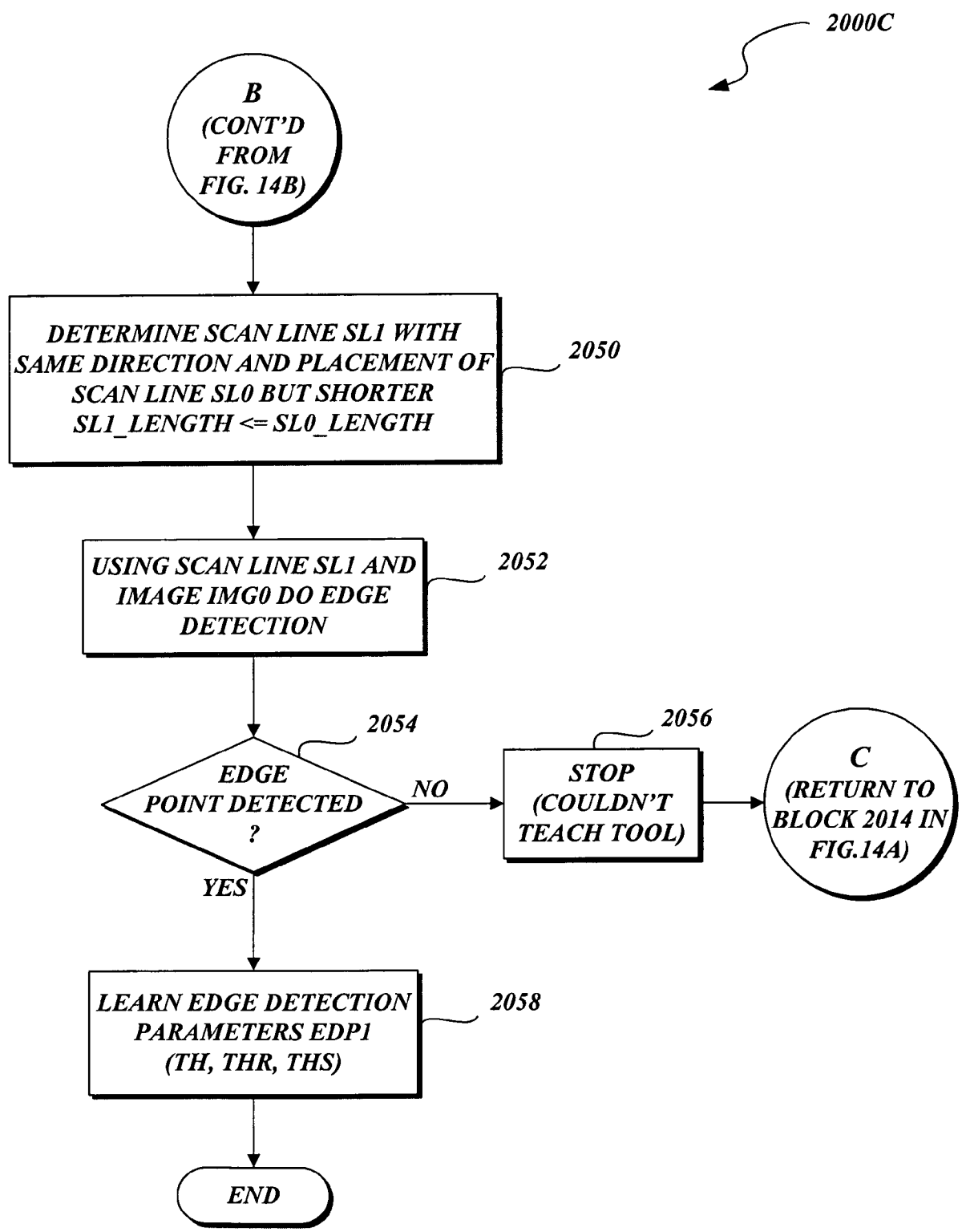

FIGS. 14A-14C are flow diagrams illustrative of one exemplary embodiment of a routine 2000, labeled as portions 2000A-2000C in FIGS. 14A-14C, respectively, for performing an occluded feature determination in learn/train/teach mode. In one embodiment, the routine 2000 is performed at the block 1730 of FIG. 13. As shown in FIG. 14A, at a block 2014, within the image IMG0 and the tool that is drawn in the GUI where the region of interest (ROI) is determined, the user selects a point P0 in the boundary of the feature to measure. At a block 2016, the scan line SL0 is determined using the point P0 and the region of interest. The length of the scan line SL0 is represented by the variable SL0_LENGTH.

At a block 2018, the user selects parameters for the morphology filter F0 to use, including closing or opening and mask type and size. In general, "closing" is utilized for a bright feature on a dark background and "opening" is utilized for a dark feature on a bright background. In one embodiment, the mask type may be selected to be a 3×3 square or a 5×5 disk. At a decision block 2020, a determination is made as to whether the user has selected an automatic option for determining the number of iterations. If the user does select the automatic option, then the routine continues to a block 2022, where the user enters the dimension of the grid D0 from which the number of iterations N0 is automatically determined. If the user does not select the automatic option, then the routine continues to a block 2024, where the user enters the number of iterations N0 to apply for the filter F0. The routine then continues to a point A that is continued in FIG. 14B.

In FIG. 14B, the routine continues from point A to a block 2030, where the filter F0 is applied to the image IMG0 in the region of interest for the number of iterations N0. This produces the filtered image IMG1. At a block 2032, edge detection is performed using the scan line SL0 in the filtered image IMG1. At a decision block 2034, a determination is made as to whether an edge point has been detected. If no edge point has been detected, then the routine continues to a block 2036, where the edge detection process is halted, and the routine continues to a point C, which returns to block 2014 in FIG. 14A, where the user may select another point P0 in the boundary so as to attempt to retry the edge detection process. If at decision block 2034 an edge point has been detected, then the routine continues to a block 2038 where the edge detection parameters EDP0 are learned, including TH, THR, and THS, after which the routine continues to a point B which is continued in FIG. 14C. For the edge detection parameters, for the edge threshold, it may be static (wherein the thresholds are not updated at run time) or dynamic (for which the thresholds are updated at run time). The threshold TH is a static image intensity threshold, which is used for a first localization or screening of the edge. The threshold THS is an edge strength threshold, that is, a variation of image intensity across the edge, which is used as a further localization or screening of the edge. The threshold THR is a dynamic threshold, that is a ratio based on TH and THS, which may be used to update the TH and THS thresholds at run time to compensate for overall intensity changes in the image, due lighting or workpiece finish variations, for example.

It is notable that the process of blocks 2032 to 2038 are applied to the filtered image as opposed to the original input image. Thus, the method can be performed reliably and quickly. As outlined previously and described in more detail below, by utilizing this method to obtain the rough locations of the edge points, and then performing the more accurate edge location process on the original image data only in the locations where edge points have already roughly been determined to exist, the method of the present invention can be performed quickly, with high precision and with reliability.

As shown in FIG. 14C, from the point B the routine continues to a block 2050, where a new scan line SL1 is determined which has the same direction and placement of the original scan line SL0, but shorter. The goal of using a shorter scan line is to analyze a small neighborhood of the potential edge point. In one specific embodiment, a short scan line of a length of twenty-one pixels may initially be utilized. At a block 2052, edge detection is performed using the scan line SL1 and the original image IMG0. At a block 2054, a determination is made as to whether an edge point has been detected. If an edge point has not been detected, then the routine continues to a block 2056, where the edge detection process is halted, and the routine continues to a point C which returns to block 2014 of FIG. 14A, where the user may select another point in the boundary to restart the edge detection process. If at block 2054 an edge point is detected, then the routine continues to a block 2058 where the edge detection parameters EDP1 are learned, including TH, THR, and THS.

It will be appreciated that the length of the scan line SL1 that is determined at block 2050 is critical because it is part of the process to determine if a potential edge point is kept or discarded. In one embodiment, the length determination may be done as a constant, or the initial constant length may be modified by analysis of the scan line. For example, if it is a rising edge, then the scan line should have dark pixels followed by bright pixels. If it does not, then pixels that do not follow this pattern should be discarded. In another embodiment, a 2-dimensional analysis of each potential edge point may be performed to decide if the edge point is kept or discarded.

Figure 15A:
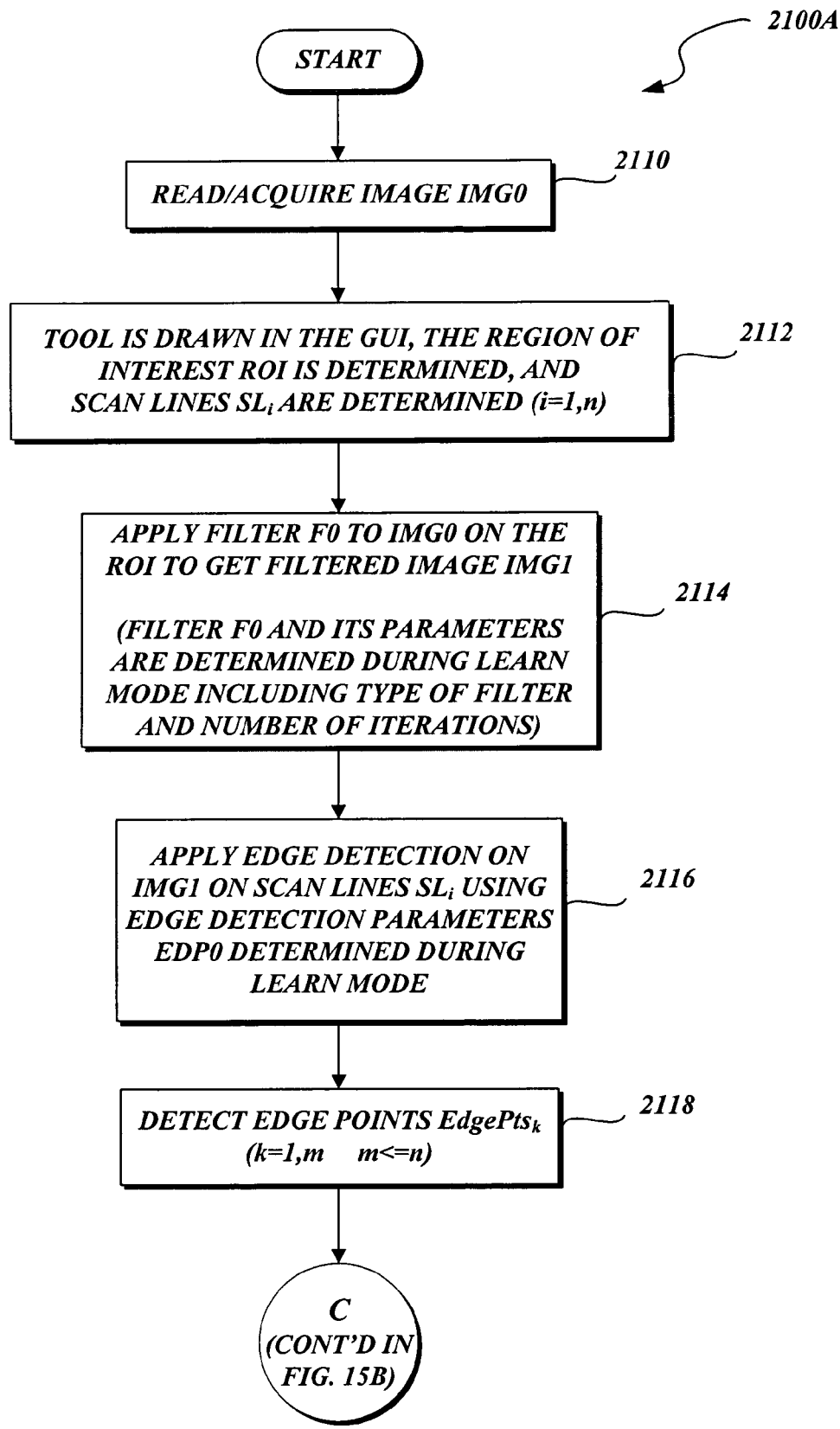
FIGS. 15A and 15B are flow diagrams illustrative of one exemplary embodiment of a routine for executing operations to detect an occluded feature in a run mode.
Figure 15B:
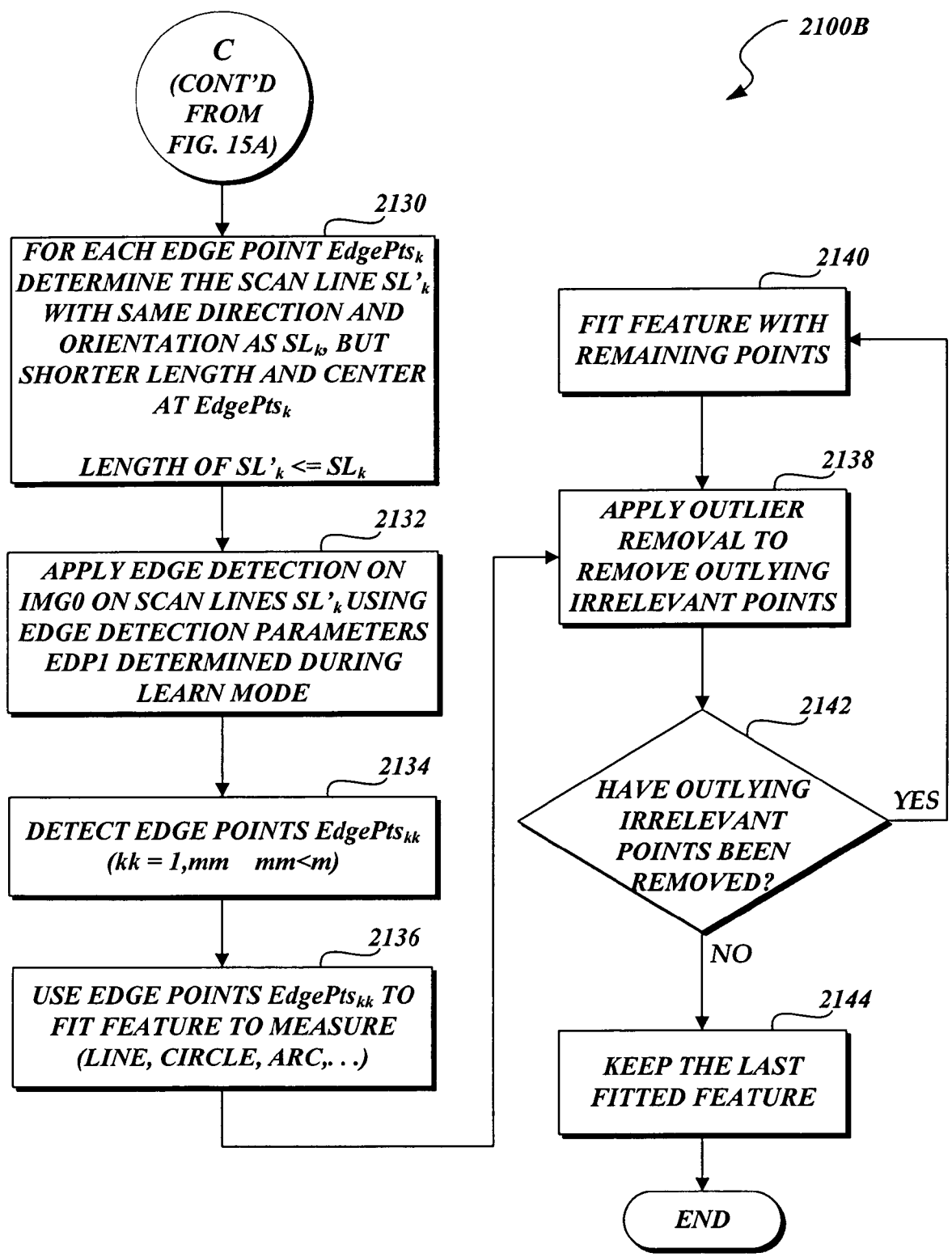

FIGS. 15A and 15B are flow diagrams illustrative of one exemplary embodiment of a routine 2100 for executing an occluded feature run mode. As shown in FIG. 15A, at a block 2110, the image IMG0 is read/acquired. At a block 2112, the tool is drawn in the GUI, the region of interest ROI is determined, and the scan lines SL1 are determined (i=1,n). At a block 2114, the filter F0 (which was selected during the learn mode of FIG. 14A) is applied to the input image IMG0 on the region of interest ROI so as to obtain the filtered image IMG1. It should be noted that the filter F0 and its parameters, including the type of filter and the number of iterations, were determined during the learn mode of FIGS. 14A and 14B. At a block 2116, edge detection is performed on the filtered image IMG1 on the scan lines $SL_i$ using the edge detection parameters EDP0 that were determined during the learn mode of FIGS. 14A and 14B. At a block 2118, the edge points EdgePts$_k$ are detected (k=1,m where m≦n). The routine then continues to a point C, which is continued in FIG. 15B.

As shown in FIG. 15B, from the point C the routine continues to a block 2130, where for each of the edge points EdgePts$_k$, a scan line $SL'_k$ is determined with the same direction and orientation as the scan line $SL_k$, but shorter and with a center at the edge point EdgePts$_k$. Thus, the length of the scan line $SL'_k$ is generally less than the length of the scan line $SL_k$. At a block 2132, edge detection is applied on the original image IMG0 on the scan lines $SL'_k$ using the edge detection parameters EDP1 that were determined during the learn mode of FIG. 14C. At a block 2134, the edge points EdgePts$_{kk}$ are detected (kk=1,mn where mn<m). At a block 2136, the edge points EdgePts$_{kk}$ are used to fit the feature to measure (e.g., line, circle, arc, etc.). At a block 2138, outlier edge points are removed, if there are any. At a decision block 2142, a determination is made as to whether any outlying irrelevant points were removed at block 2138. If any outlying irrelevant points were removed, then the routine continues to a block 2140, where the feature is fit to the remaining points, after which the routine returns block 2138. If at decision block 2142 the determination is that no outlying irrelevant points needed to be removed at block 2138, then the routine continues to a block 2144, where the last fitted feature is kept, after which the routine ends. One example of an outlier removal process that corresponds to the blocks 2136-2142 is the following:

1. The data points detected are used to fit the feature (line, circle, . . . )

2. The error of each data point relative to the fit is calculated. The error for each point could be defined as the minimum distance between each data point and the fitted feature 3. The maximum error is determined (max_error)

4. If max_error is >OUTLIER_THRESHOLD then the point that corresponds to max_error is an outlier. This point is removed and the algorithm (step 1 to step 4) starts again without this point. The algorithm iterates until no more points are removed (i.e. until max_error is less than OUTLIER_THRESHOLD)

The value of OUTLIER_THRESHOLD is important, because it represents the outlier removal strength. The smaller the value of OUTLIER_THRESHOLD, the more points are likely to be removed. There are different ways to determine OUTLIER_THRESHOLD. One common way is to determine the gaussian distribution characteristics of the errors of all the data points (see step 2, above) and then multiply the standard deviation of the distribution by a desired number and set the outlier limits at the mean of the distribution plus and minus this value. A commonly used value is 2 times the standard deviation, such that a data point is considered an outlier if its error is higher than the error of 95.45% of all the points.

It will be appreciated that the length of the scan line determined at block 2130 is important in various embodiments because it is part of the process to restrict potential edge points. In one embodiment, different scan lines on the tool may be provided with different lengths (some scan lines will be placed close to the grid and, therefore, should be short in order to avoid having an edge correspond to the grid). The length determination may be done as a constant, or the initial constant length can be modified by analysis of the scan line. For example, if it is a rising edge, then the scan line should have dark pixels followed by bright pixels, and if it does not, then pixels that do not follow this pattern should be discarded at the end of the scan line. At block 2134, in one embodiment several criteria can be utilized to determine whether a potential edge point will be kept. One of these criteria is the use of the edge detection parameters EDP1 (an edge point will not be detected if it does not satisfy the strength THS of EDP1). Another criteria that may be utilized is an analysis of the neighbor pixels in the scan line or in the 2-dimensional neighborhood. In another embodiment, a robustness criterion can be added to the tool to define the "acceptance strength" for a potential edge point to be kept as a good edge point.

It will be appreciated that the methods of the present invention provide for simple operation by a user, in that standardized types of video tools may be utilized, rather than requiring customized operations. In other words, a user is not required to utilize scripting languages for implementing customized operations. Instead, the system allows for the use of pre-programmed icons and the like that even an unskilled user is able to use with minimal training. Furthermore, as noted above, the region of interest is able to encompass both the occluded and occluding features. Thus, the user is not required to place individual point tools over all of the desired occluded feature regions.

It should be appreciated that certain existing machine vision inspection systems can employ various embodiments of the systems and methods according to this invention with minimal or no "retrofit" modifications to such existing machines. In various exemplary embodiments, only the addition of machine vision inspection software methods and/or modifications according to the principles of this invention are included in the retrofit modifications.

While this invention has been described in conjunction with the exemplary embodiments outlined above, various alternatives, modifications, variations, improvements, and/or substantial equivalents, whether known or that are or may be presently unforeseen, may become apparent to those having at least ordinary skill in the art. Accordingly, the exemplary embodiments of the invention, as set forth above, are intended to be illustrative, not limiting. Various changes may be made without departing from the spirit and scope of the invention. Therefore, the claims as filed and as they may be amended are intended to embrace all known or later-developed alternatives, modifications, variations, improvements, and/or substantial equivalents.

The embodiments of the invention in which an exclusive property or privilege is claimed are defined as follows:

1. A method for inspecting an image of a workpiece acquired by a machine vision inspection system, the machine vision inspection system having a user interface usable to define a sequence of operations usable to inspect the image, the method comprising:
    using the machine vision inspection system to perform the steps comprising:
    acquiring an original image including an occluding feature;
    performing processing on the original image to produce a filtered image in which the occluding feature is removed;
    determining the locations of one or more edge points in the filtered image; and
    returning to the original image and utilizing the determined locations of the one or more edge points that were located in the filtered image as a basis for where to perform edge detection in the original image, and performing the edge detection in the original image so as to determine an edge location in the original image.

2. The method of claim 1, wherein determining the edge location in the original image comprises determining an edge location with sub-pixel resolution.

3. The method of claim 2, wherein the processing that produces the filtered image utilizes morphology filters that close or open with at least one of a 3×3 square mask or a 5×5 disk mask.

4. The method of claim 1, wherein the occluding feature appears in the original image as at least a portion of a foreground object that interfered with a viewing of a background object.

5. A method for inspecting an image of a workpiece acquired by a machine vision inspection system, the machine vision inspection system having a user interface usable to define a sequence of operations usable to inspect the image, the method comprising:
    using the machine vision inspection system to perform the steps comprising:
    acquiring an original image;
    performing processing on the original image to produce a filtered image;
    determining the locations of one or more edge points in the filtered image; and
    determining an edge location in the original image based on the determined locations of the one or more edge points that were located in the filtered image;
    wherein determining the edge location in the original image comprises performing edge detection operations in a close neighborhood of the original image that surrounds a location in the original image that is congruent with the determined location of the one or more edge points that were located in the filtered image.

6. The method of claim 5, wherein the edge detection operations performed in the close neighborhood comprise determining edge points in the original image, determining a line fit to the edge points determined in the original image, and determining the edge location in the original image with sub-pixel resolution based on the determined line.

7. A method for inspecting an image of a workpiece acquired by a machine vision inspection system, the machine vision inspection system having a user interface usable to define a sequence of operations usable to inspect the image, the method comprising:
    using the machine vision inspection system to perform the steps comprising:
    acquiring an original image;
    performing processing on the original image to produce a filtered image;
    determining the locations of one or more edge points in the filtered image; and
    determining an edge location in the original image based on the determined locations of the one or more edge points that were located in the filtered image;
    wherein determining the location of one or more edge points in the filtered image comprises using a first scan line, and determining the edge location in the original image comprises using a second scan line in the original image that corresponds to the first scan line in the filtered image, the second scan line being shorter than the first scan line.

8. The method of claim 7, wherein the second scan line has a same direction and a same scan line location as the first scan line.

9. A method for inspecting an image of a workpiece acquired by a machine vision inspection system, the machine vision inspection system having a user interface usable to define a sequence of operations usable to inspect the image, the method comprising:
    acquiring an original image;
    performing processing on the original image to produce a filtered image;
    determining the locations of one or more edge points in the filtered image;
    determining an edge location in the original image based on the determined locations of the one or more edge points that were located in the filtered image:
    providing an edge detection tool as part of the user interface of the machine vision inspection system, wherein the edge detection tool includes operations that provide at least the method steps comprising processing to produce the filtered image, determining the location of one or more edge points in the filtered image, and determining the edge location in the original image;
    training the edge detection tool during a learning mode of operation of the machine vision inspection system to establish edge detection parameters of the edge detection tool;
    performing the step of acquiring an original image during a run mode of operation of the machine vision inspection system; and
    operating the edge detection tool during the run mode to determine the edge location in the original image.

10. The method of claim 9, wherein training the edge detection tool comprises determining a first set of edge detection parameters for determining the location of the one or more edge points in the filtered image and a second set of edge detection parameters for determining the edge location in the original image.

11. The method of claim 10, wherein the edge detection parameters that are determined while training the edge detection tool are utilized for operating the edge detection tool during the run mode.

12. The method of claim 10, wherein the edge detection parameters comprise at least a static threshold and an edge strength threshold.

13. The method of claim 12, wherein the edge detection parameters further comprise a dynamic threshold.

14. A method for inspecting a workpiece image that includes an occluding feature, the occluding feature appearing in the image as at least a portion of a foreground object that interfered with a viewing of a background object in the image, the method comprising:

using the machine vision inspection system to perform the steps comprising:

determining the locations of one or more edge points in a first filtered image that is a filtered version of the workpiece image with the occluding feature filtered out; and returning to the workpiece image that includes the occluding feature and utilizing the determined locations of the one or more edge points that were located in the first filtered image as a basis for where to perform edge detection in the workpiece image, and performing the edge detection in the workpiece image so as to determine an edge location in the workpiece image, wherein the edge location in the workpiece image that includes the occluding feature is more accurate than a corresponding edge location in the first filtered image with respect to a corresponding edge location in an original unfiltered image of the workpiece.

15. The method of claim 14, wherein the first filtered version of the image is obtained by applying filters to the workpiece image that includes the occluding feature.

16. The method of claim 14, wherein the workpiece image that includes the occluding feature is not the original unfiltered image of the workpiece.

17. The method of claim 14, wherein the occluding feature is a grid feature.

18. The method of claim 17, wherein the foreground object is an overlay grid of a flat panel display screen mask.

19. A method for inspecting a workpiece image that includes an occluding feature, the method comprising:

using the machine vision inspection system to perform the steps comprising:

determining the locations of one or more edge points in a first filtered image that is a filtered version of the workpiece image with the occluding feature filtered out; and determining an edge location in the workpiece image that includes the occluding feature based on the determined locations of the one or more edge points that were located in the first filtered image, wherein the edge location in the workpiece image that includes the occluding feature is more accurate than a corresponding edge location in the first filtered image with respect to a corresponding edge location in an original unfiltered image of the workpiece;

wherein determining the locations of one or more edge points in the first filtered image comprises utilizing a first scan line, and determining the edge location in the workpiece image that includes the occluding feature comprises utilizing a second scan line, wherein the second scan line is located in the workpiece image that includes the occluding feature to correspond to a location of the first scan line in the first filtered image, and the second scan line is shorter than the first scan line.

20. The method of claim 19, wherein the second scan line has the same general direction and placement as the first scan line.

* * * * *

UNITED STATES PATENT AND TRADEMARK OFFICE
CERTIFICATE OF CORRECTION

PATENT NO. : 7,522,763 B2
APPLICATION NO. : 10/903714
DATED : April 21, 2009
INVENTOR(S) : A. Tessadro It is certified that error appears in the above-identified patent and that said Letters Patent is hereby corrected as shown below:

| COLUMN | LINE | ERROR |
|---|---|---|
| 17 (Claim 1, | 21-33 lines 8-20) | The subclauses of Claim 1 should be indented as follows: |

1. A method for inspecting an image of a workpiece acquired by a machine vision inspection system, the machine vision inspection system having a user interface usable to define a sequence of operations usable to inspect the image, the method comprising:

using the machine vision inspection system to perform the steps comprising:

acquiring an original image including an occluding feature;

performing processing on the original image to produce a filtered image in which the occluding feature is removed;

determining the locations of one or more edge points in the filtered image; and returning to the original image and utilizing the determined locations of the one or more edge points that were located in the filtered image as a basis for where to perform edge detection in the original image, and performing the edge detection in the original image so as to determine an edge location in the original image.

Signed and Sealed this

Fourth Day of May, 2010

David J. Kappos
*Director of the United States Patent and Trademark Office*

| COLUMN | LINE | ERROR |
|---|---|---|
| 17<br>(Claim 5, lines 8-15) | 52-59 | The subclauses of Claim 5 should be indented as follows: |

5. A method for inspecting an image of a workpiece acquired by a machine vision inspection system, the machine vision inspection system having a user interface usable to define a sequence of operations usable to inspect the image, the method comprising:

using the machine vision inspection system to perform the steps comprising:

acquiring an original image;

performing processing on the original image to produce a filtered image;

determining the locations of one or more edge points in the filtered image; and determining an edge location in the original image based on the determined locations of the one or more edge points that were located in the filtered image;

wherein determining the edge location in the original image comprises performing edge detection operations in a close neighborhood of the original image that surrounds a location in the original image that is congruent with the determined location of the one or more edge points that were located in the filtered image.

| COLUMN | LINE | ERROR |
|---|---|---|
| 18<br>(Claim 7, lines 8-15) | 12-19 | The subclauses of Claim 7 should be indented as follows: |

7. A method for inspecting an image of a workpiece acquired by a machine vision inspection system, the machine vision inspection system having a user interface usable to define a sequence of operations usable to inspect the image, the method comprising:

using the machine vision inspection system to perform the steps comprising: acquiring an original image;

performing processing on the original image to produce a filtered image;

| COLUMN | LINE | ERROR |
|---|---|---|
| 18<br>(Claim 7, | 12-19<br>lines 8-15) |     determining the locations of one or more edge points in the filtered image; and |
| | [Continued] |     determining an edge location in the original image based on the determined locations of the one or more edge points that were located in the filtered image; |
| | |     wherein determining the location of one or more edge points in the filtered image comprises using a first scan line, and determining the edge location in the original image comprises using a second scan line in the original image that corresponds to the first scan line in the filtered image, the second scan line being shorter than the first scan line. |
| 18<br>(Claim 9, line 13) | 44 | "image:" should read --image;-- |
| 20<br>(Claim 19, line 5-16) | 12-23 | The subclauses of Claim 19 should be indented as follows: |
| | | 19.    A method for inspecting a workpiece image that includes an occluding feature, the method comprising: |
| | |     using the machine vision inspection system to perform the steps comprising: |
| | |         determining the locations of one or more edge points in a first filtered image that is a filtered version of the workpiece image with the occluding feature filtered out; and |
| | |         determining an edge location in the workpiece image that includes the occluding feature based on the determined locations of the one or more edge points that were located in the first filtered image, wherein the edge location in the workpiece image that includes the occluding feature is more accurate than a corresponding edge location in the first filtered image with respect to a corresponding edge location in an original unfiltered image of the workpiece; |

| COLUMN | LINE | ERROR |
|---|---|---|
| 20 (Claim 19, | 12-23 line 5-16) | wherein determining the locations of one or more edge points in the first filtered image comprises utilizing a first scan line, and determining the edge location in the |
| | [Continued] | workpiece image that includes the occluding feature comprises utilizing a second scan line, wherein the second scan line is located in the workpiece image that includes the occluding feature to correspond to a location of the first scan line in the first filtered image, and the second scan line is shorter than the first scan line. |